(12) United States Patent
Shiiyama

(10) Patent No.: US 7,355,632 B2
(45) Date of Patent: Apr. 8, 2008

(54) IMAGE SENSING APPARATUS AND CONTROL METHOD THEREFOR, AND SUBJECT DETERMINATION APPARATUS, SUBJECT MANAGEMENT APPARATUS, AND CONTROL METHOD THEREFOR

(75) Inventor: Hirotaka Shiiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 837 days.

(21) Appl. No.: 10/776,776

(22) Filed: Feb. 11, 2004

(65) Prior Publication Data

US 2004/0169731 A1    Sep. 2, 2004

(30) Foreign Application Priority Data

| Feb. 18, 2003 | (JP) | ............................. 2003-040190 |
| Feb. 21, 2003 | (JP) | ............................. 2003-044842 |
| Feb. 21, 2003 | (JP) | ............................. 2003-044843 |
| Mar. 14, 2003 | (JP) | ............................. 2003-071034 |

(51) Int. Cl.
   *H04N 5/232* (2006.01)
(52) U.S. Cl. .................. 348/211.1; 348/231.3
(58) Field of Classification Search ............ 348/207.1, 348/211.1, 211.2, 211.4, 211.6, 231.3, 231.5, 348/143, 207.11, 208.16, 211.3, 211.13, 220.1; 396/57

See application file for complete search history.

(56) References Cited

U.S. PATENT DOCUMENTS 6,337,951 B1   1/2002 Nakamura ................... 396/57
6,397,334 B1   5/2002 Chainer et al.
6,526,158 B1*  2/2003 Goldberg .................... 382/115
7,248,285 B2*  7/2007 Needham .................. 348/207.1
2003/0095032 A1* 5/2003 Hoshino et al. ........... 340/5.92

FOREIGN PATENT DOCUMENTS

EP   0 920 179 A   6/1999
JP   04-070727 A   3/1992

(Continued)

OTHER PUBLICATIONS

M. Boukraa, et al.: "Tag-based vision: assisting 3d scene analysis with radio-frequency tags" Information Fusion, 2002. Proceedings of the Fifth International Conference on Jul. 8-11, 2002, Piscataway, NJ, USA, IEEE, vol. 1, Jul. 8, 2002, pp. 412-418, XP010595150, ISBN: 0-9721844-1-4.

(Continued)

*Primary Examiner*—Lin Ye
*Assistant Examiner*—Nelson D. Hernández
(74) *Attorney, Agent, or Firm*—Morgan & Finnegan, LLP

(57) ABSTRACT

This invention is to simplify operations for photographing a subject and acquiring radio tag information. In this invention, when a radio tag information registration photographing mode is selected, and it is detected that the photographing button (shutter button) is pressed halfway, a radio tag detector generates a radio wave that excites a radio tag. Whether a response from the radio tag is received is then determined. When a response is received from the radio tag, and a radio tag ID can uniquely be decided, a status "photographing OK" is indicated. When the photographing button in the half-pressed state is pressed completely, image sensing processing is executed. Radio tag information and obtained image information are stored in an information format, in which they are paired.

16 Claims, 34 Drawing Sheets

FOREIGN PATENT DOCUMENTS

| | | |
|---|---|---|
| JP | 09-135416 A | 5/1997 |
| JP | 10198731 | 7/1998 |
| JP | 10-210337 A | 8/1998 |
| JP | 10-241093 A | 9/1998 |
| JP | 10-243325 A | 9/1998 |
| JP | 10-271375 A | 10/1998 |
| JP | 10-312444 A | 11/1998 |
| JP | 2000-029091 A | 1/2000 |
| JP | 2000-261751 A | 9/2000 |
| JP | 2000-295570 A | 10/2000 |
| JP | 2001-006061 A | 1/2001 |
| JP | 2001-014277 A | 1/2001 |
| JP | 2001-273056 | 10/2001 |
| JP | 2002-037417 A | 2/2002 |
| JP | 2004-029749 A | 1/2004 |
| JP | 2004-120304 A | 4/2004 |
| JP | 2004-120569 A | 4/2004 |
| JP | 2004-175509 A | 6/2004 |
| WO | WO 02/080540 A1 | 10/2002 |

OTHER PUBLICATIONS

European Search Report, dated Mar. 24, 2005.
Oct. 31, 2005, Korean Office Action.

* cited by examiner

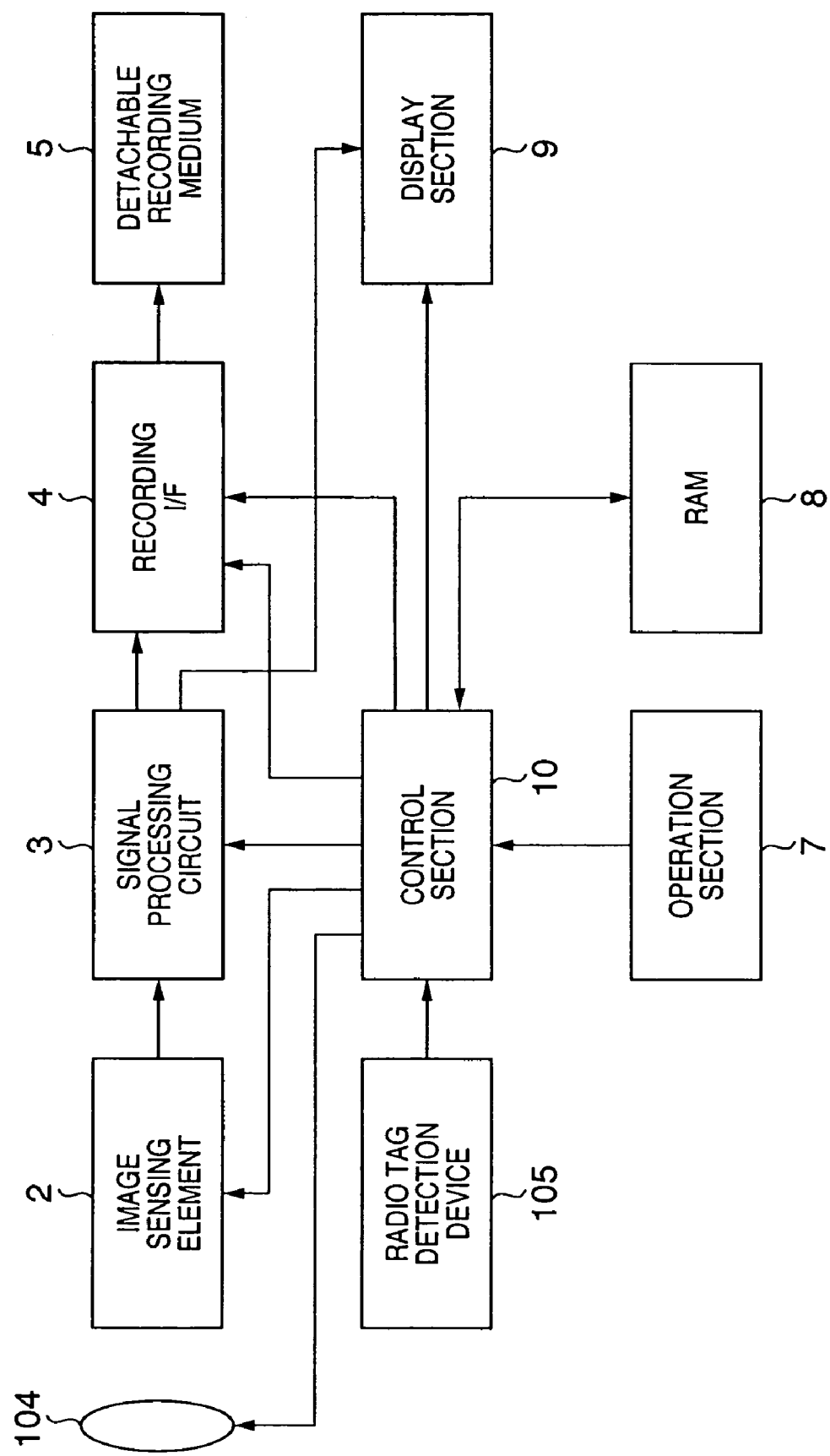

FIG. 4

| RADIO TAG ID | POINTER TO IMAGE | IMAGE SIZE | IMAGE ID | DATE |
|---|---|---|---|---|
| 13571468 | Img00010001.jpg | 640,480 | 1 | 20021213 |
| .. | | | | |

T: RADIO TAG OPERATION
   TIME THRESHOLD VALUE
N: THRESHOLD VALUE N OF NUMBER OF
   TIMES OF RADIO TAG OFF INSTRUCTION

FIG. 12

| RADIO TAG ID | POINTER TO IMAGE | IMAGE SIZE | IMAGE ID | DATE |
|---|---|---|---|---|
| (001, 40db), (002, 35db) | Img00100001.jpg | 640,480 | 1 | 20021213 |
| | .. | | | |

FIG. 18

| RADIO TAG ID | POINTER TO IMAGE | DATE | CATEGORY | CAPTION |
|---|---|---|---|---|
| 13571468 | Img0010001.jpg | 20021213 | SMALL ARTICLE | RED GLASSES |
| 13571470 | Img0010002.jpg | 20021213 | SMALL ARTICLE | SILVER-RIMMED SPECTACLES |
| 13571472 | Img0010003.jpg | 20021215 | SMALL ARTICLE | SUNGLASSES |
| 13571474 | Img0010004.jpg | 20021216 | ACCESSORY | WATCH |
| 13571476 | Img0010005.jpg | 20021216 | CLOTHING | HAT |
| 13571478 | Img0010006.jpg | 20021216 | AV DEVICE | DIGITAL CAMERA |
| | .. | | | |

FIG. 24

| RADIO TAG ID | PHOTOGRAPHED IMAGE DATA | DATE |
|---|---|---|
| 13571468 | | 2003△△××  |
| 13571470 | | 2003△△×× |
| 13571471 | | 2003△△×× |

3401 — RADIO TAG ID
3402 — PHOTOGRAPHED IMAGE DATA
3403 — DATE

FIG. 31

| RADIO TAG ID | POINTER TO MACRO-PHOTOGRAPHED IMAGE OF FEATURE POINT UNIQUE TO TARGET ARTICLE | DATE | CAPTION THAT EXPRESSES, BY WORDS, POSITION OF FEATURE POINT UNIQUE TO ARTICLE |
|---|---|---|---|
| 13571468 | Img0010001.jpg | 20021213 | LOGO PLATE |
| 13571470 | Img0010002.jpg | 20021213 | TAG |

IMAGE SENSING APPARATUS AND CONTROL METHOD THEREFOR, AND SUBJECT DETERMINATION APPARATUS, SUBJECT MANAGEMENT APPARATUS, AND CONTROL METHOD THEREFOR

FIELD OF THE INVENTION

The present invention relates to a technique for photographing, storing, and managing a subject.

BACKGROUND OF THE INVENTION

A commodity management technique is conventionally used, in which a radio tag is attached to each article, and a tag ID is read by a detector (e.g., Japanese Patent Laid-Open No. 10-198731).

This prior art has described a technique for preparing and managing a database of radio tag IDs but does not consider any technique for combining the radio tag IDs with image information to implement a more advanced function. How to easily acquire and register auxiliary information such as image information in association with tag IDs is not taken into consideration, either.

SUMMARY OF THE INVENTION

It is an object of the present invention to easily implement photographing of a subject and acquisition of radio tag information.

In order to achieve the above object, for example, an image sensing apparatus according to the present invention has the following arrangement.

That is, a photographing apparatus comprises information acquisition means for acquiring radio information from information transmission means, the information transmission means being attached to a subject to store predetermined information and transmit the predetermined information as the radio information, wherein both photographing of the subject and acquisition of the radio information by the information acquisition means are executed on the basis of an operation of a common operation section.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a block diagram showing the arrangement of the photographing apparatus;

FIG. 4 is a view showing an example of an information schema that stores a pair of radio tag information and obtained image information;

FIG. 12 is a view showing an example of an information schema that stores a pair of radio tag information and obtained image information;

FIG. 18 is a view showing an example of an information schema that stores pairs of radio tag information and obtained image information;

FIG. 24 is a view showing an example of an information schema;

FIG. 31 is a view showing an example of an information schema;

DETAILED DESCRIPTION OF THE PREFERRED EMBODIMENTS

The preferred embodiments of the present invention will be described below with reference to the accompanying drawings.

First Embodiment

Figure 1A:
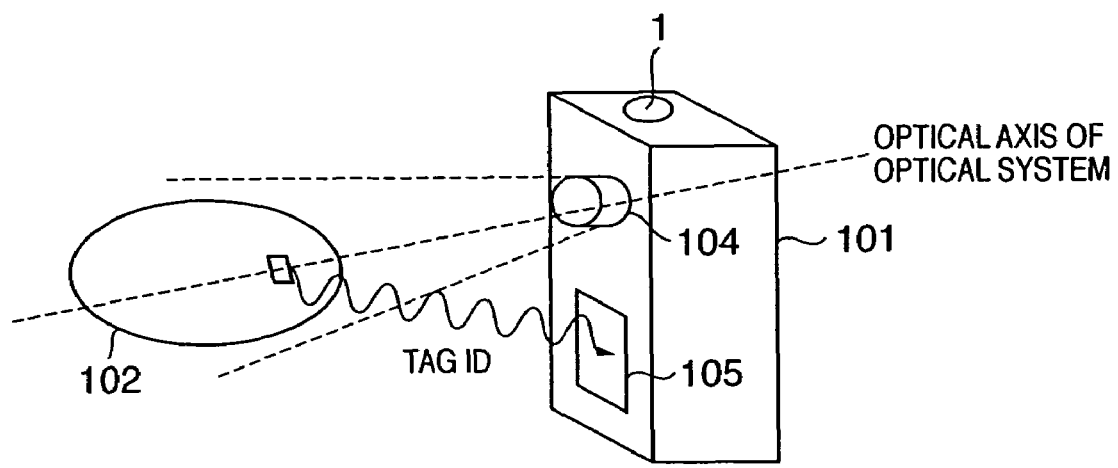
FIGS. 1A and 1B are views showing a photographing apparatus 101 according to the first embodiment.

FIG. 1A shows a photographing apparatus 101 according to this embodiment. The photographing apparatus 101 corresponds to a device having a photographing function, such as a digital camera, a cellular phone terminal with a camera, or a video camera. Referring to FIG. 1A, reference numeral 102 denotes a subject; 103, a radio tag serving as an information transmission means which is attached to the subject 102 to store predetermined information and transmit the predetermined information as radio information; 104, a lens serving as a photographing optical system to photograph the subject 102; and 105, a radio tag detector serving as an information acquisition means (radio tag detection device) to acquire radio tag information (tag ID). In this embodiment, the photographing apparatus separately has the photographing unit serving as an acquisition means and the information acquisition means. However, the photographing unit and information acquisition means may be integrated.

Radio tag information is unique ID information that can specify, e.g., an article or site. An electromagnetic induction radio tag device has recently been announced as an example of a radio tag. This device stores number information unique to an individual by using a very small silicon chip called a μ-chip. Upon receiving an external radio wave, the device obtains power by an induced electromotive force and becomes able to transmit the number information unique to an individual by radio. An example of a radio tag in a high-frequency band is a microwave radio tag device which changes a radio wave energy itself into power. However, the radio tag is not particularly limited as long as it can implement a function of this type.

When the subject 102 is to be photographed and registered in a database, a radio tag is attached to the subject 102 in advance before photographing. Various methods can be used to attach a radio tag. For example, a radio tag may be bonded by using an adhesive seal or mixed in a paint and applied to a position where transmission of a radio wave is not impeded. Alternatively, a radio tag may be incorporated in a subject, attached or added to part of a subject, or mounted on a subject. However, the present invention is not particularly limited to the above-described attachment methods. When a radio tag is attached to a person or animal, a photographed image of the person or animal having the radio tag can be regarded as equivalent to a photographed image of an article. Even when a radio tag is attached to a pendant or pierced earring for personal use of a person or a collar of an animal, a photographed image of the person or animal having the radio tag can be regarded as equivalent to a photographed image of an article.

To execute both photographing of the subject 102 and acquisition of radio tag information by a series of operations, the photographing apparatus 101 preferably keeps the same posture for photographing and tag information reception. For this purpose, the radio tag detector 105 is arranged at a position (in this embodiment, at a position on a surface of the photographing apparatus near the lens 104 and on the same surface side as that of the lens 104) where a radio wave from the radio tag can keep sufficient sensitivity and/or directivity while making the lens 104 serving as a photographing optical system face the subject 102. If the direction of directivity is the same or almost the same as the photographing direction of the lens 104, and a sufficient sensitivity can be maintained, the radio tag detector 105 may be present on the rear surface of the photographing apparatus 101.

Figure 1B:
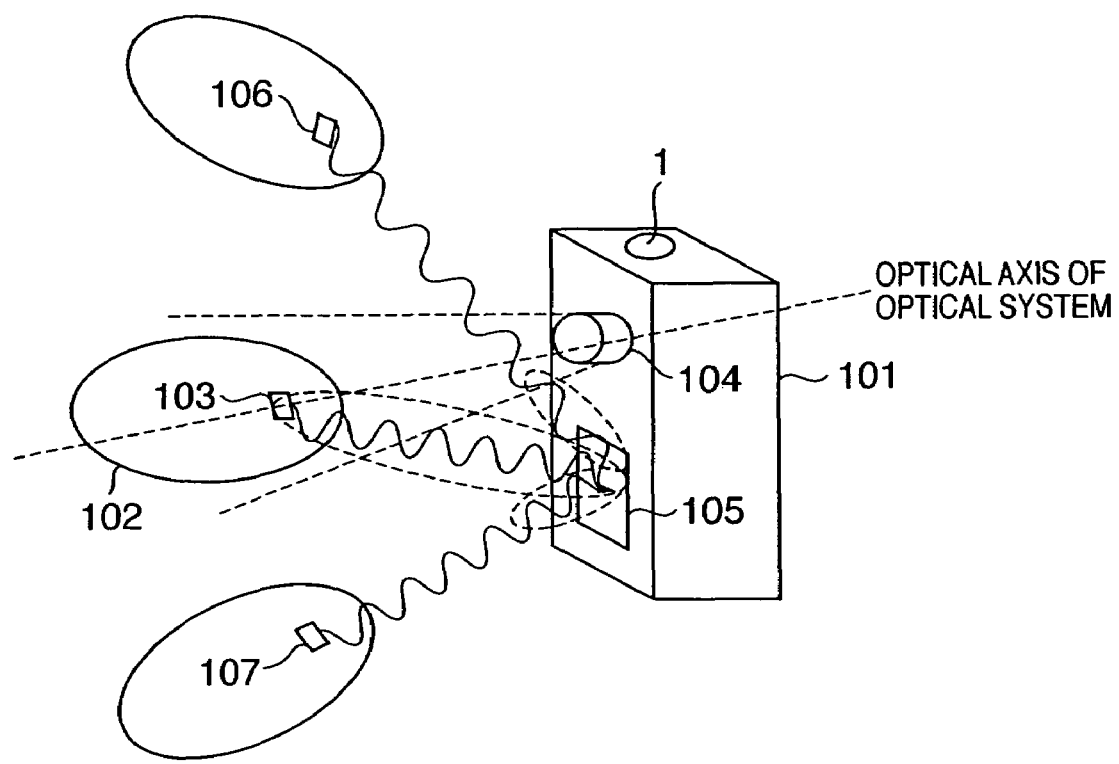

As shown in FIG. 1B, when a plurality of radio tags 103, 106, and 107 are present, simultaneous reception from radio tags except the target must be avoided. To do this, preferably, the detection section of the radio tag detector 105 has a directivity of a predetermined angle, and the photographing direction of the lens 104 is the same or almost the same as the direction of directivity.

Macro-photographing normally used to photograph a small article is executed at a distance of about 20 to 40 cm. The axis of directivity of the radio tag detector 105 may cross the optical axis of the optical system at a position separated from the lens by about 20 to 40 cm.

In the example shown in FIG. 1B, the size of each elliptic (dotted ling in FIG. 1B) from the radio tag detector 105 as a target indicates the directional sensitivity. When the radio tag 103 is present on the optical axis of the optical system and at the intersection between the optical axis and the direction of maximum directivity of the radio tag, the sensitivity to the radio waves from the radio tags 106 and 107 as non-targets is small. Hence, the influence of the radio tags 106 and 107 is small.

FIG. 2 is a block diagram showing the arrangement of the photographing apparatus 101. Reference numeral 104 denotes the photographing optical system. An image sensing element 2 such as a CCD image sensing element or CMOS image sensing element serves as an image sensing means. A signal processing circuit 3 A/D-converts the output from the image sensing element and executes gamma conversion or color conversion processing. A recording interface circuit 4 converts the signal output through the signal processing circuit into a signal suitable for recording in a detachable recording medium 5 such as a semiconductor memory. Reference numeral 105 denotes the radio tag detection device; 7, an operation section including a shutter release 1; 8, a RAM or EEPROM that stores the control program of the photographing apparatus; 9, a display section that displays an image or warning; and 10, a control circuit which incorporates a CPU and controls the circuits in the photographing apparatus.

Figure 3:
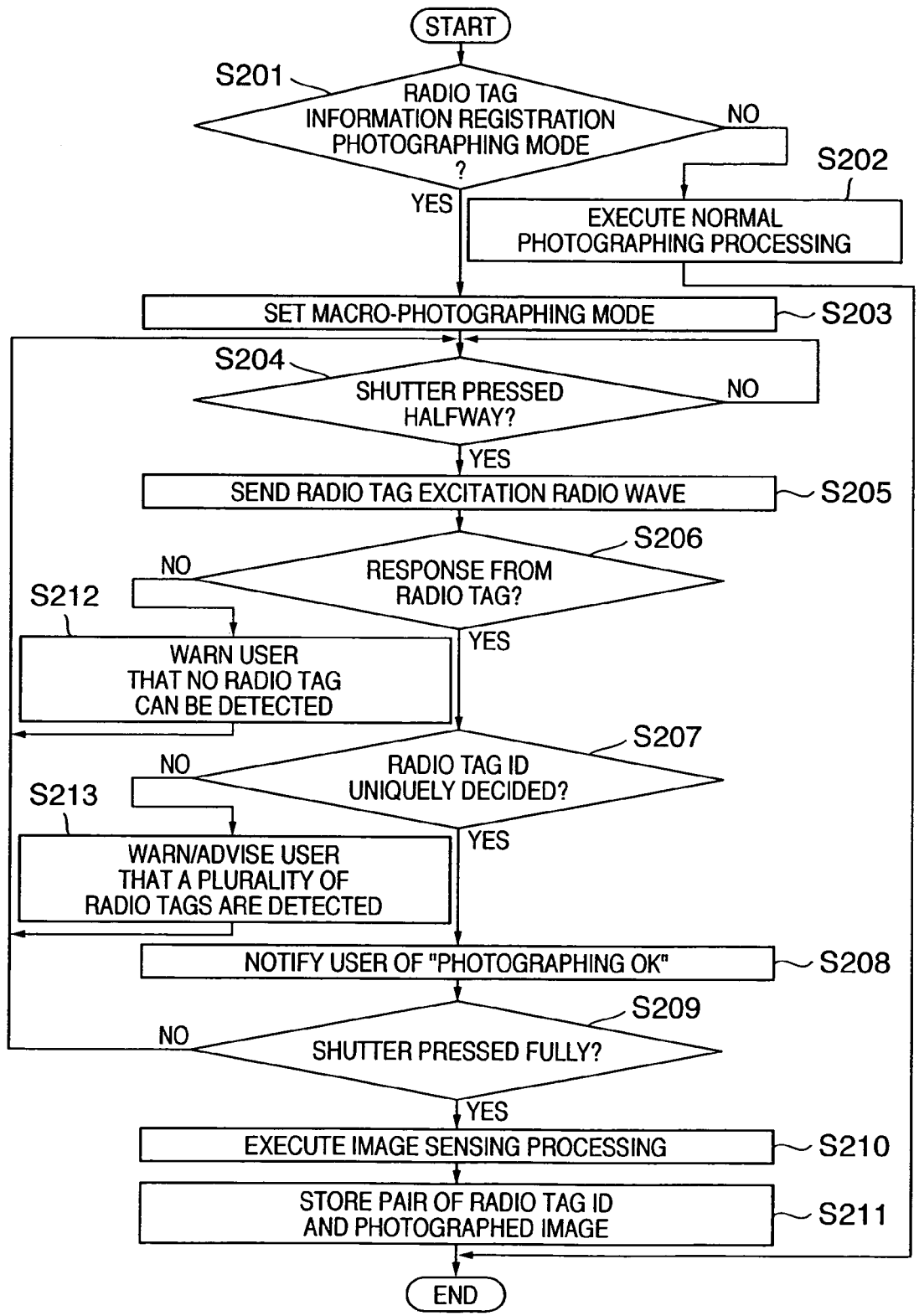
FIG. 3 is a flow chart showing processing executed by the photographing apparatus 101 according to the first embodiment.

Processing executed by the photographing apparatus 101 will be described next with reference to the flow chart shown in FIG. 3. In step S201, it is determined whether the mode selected by the user is a normal photographing mode or radio tag information registration photographing mode. To select a mode, the photographing mode may be set first, and then in that state, the mode may be switched by using another switch different from the photographing mode switch. Alternatively, the normal photographing mode and radio tag information registration photographing mode may be prepared as choices on a rotary photographing mode selection switch that is used to select an automatic or manual photographing mode in a normal camera.

When the normal photographing mode is selected in step S201, photographing processing is executed in step S202 without executing any processing related to the radio tag. Image data and automatically obtained metadata such as a date are stored. That is, the function of the radio tag detector is not concerned with the normal photographing mode. The processing is the same as normal photographing, and a detailed description thereof will be omitted.

On the other hand, when the radio tag information registration photographing mode is selected in step S201, the flow advances to step S203 to automatically switch the image sensing system to the macro-photographing mode. The subject having a radio tag is considered to be near the photographing apparatus 101. Hence, when the photographing mode is automatically switched to, e.g., the macro-photographing mode or short-range photographing mode (a mode in which the focal length is set to a short range corresponding to the detectable distance of the radio tag detector), the load on the user can be reduced.

When it is detected in step S204 that the subject is captured by the image sensing system, and the photographing button (shutter release button 1) is pressed halfway, the radio tag detector 105 generates, in step S205, a radio wave that excites the radio tag. By the electromotive force, the radio tag transmits radio tag information.

In step S206, it is determined whether a response from the radio tag is received. If YES in step S206, the flow advances to step S207. When only one radio tag information is detected, or when a plurality of pieces of radio tag information are detected, and a radio tag ID signal with the highest signal strength is stronger than a radio tag information signal having the second highest signal strength by a predetermined difference or scaling factor or more so that the radio tag information with the highest signal strength can be specified, it is determined that the radio tag ID can uniquely be decided, and the communication for radio tag search has been done successfully. Even when a plurality of radio tags are simultaneously detected, it may also be determined that the communication has been done successfully if the radio tags belong to, e.g., the same group.

When it is determined in step S207 that the communication for radio tag search has been done successfully, the flow advances to step S208 to show the status "photographing OK" by, e.g., turning on a green lamp in the viewfinder or on the main body, displaying the status on the liquid crystal display section, or outputting a warning message of voice. That the communication with the radio tag has successfully be executed is confirmed first because the communication with the radio tag fails at a higher probability than image sensing. When the successful communication with the radio tag is confirmed first, wasteful image sensing can be reduced. However, for some application purposes, the image sensing operation may be executed before the radio tag detection operation. The embodiment of the present invention also incorporates this case.

When the photographing button pressed halfway is completely pressed in step S209, image sensing processing is executed in step S210. In step S211, the radio tag information and the obtained image information are set in an information format, in which they are paired (for example, they are associated with each other by, e.g., linking them to each other or storing them in a common storage area), and stored. If the photographing button is not pressed completely within a predetermined time, the situation may have changed. The flow returns to step S204 to execute again the radio tag information transmission search processing.

As described above, when the above processing is executed while the photographing button is kept pressed halfway, the user can grasp the radio tag information detection state and execute processing depending on whether the radio tag detection has successfully be done. Hence, a wasteful image sensing operation can be avoided.

As an information schema that stores pairs of information, for example, a database DB shown in FIG. 4 is used. A DB record stores not only radio tag ID information and a pointer to that image but also metadata that can automatically be acquired, including an image size (vertical and horizontal sizes or the number of bytes), an image ID uniquely assigned to the image, and a date. The pointer to the image can be the address of the image storage destination or the path information of the image file. The schema may store the image data itself in place of the pointer to the image.

When it is determined in step S206 that the acquisition of radio tag information has failed, the flow advances to step S212 to warn the user by screen display, sound, or light. An example of the warning contents is that no radio tag information can be detected or there are a plurality of radio tag information sources. As a user-friendly method, when no radio tag information is detected, the user is warned by screen display, sound, or light to change the conditions for radio tag detection and execute photographing again.

If, in step S207, a plurality of tags are detected, and one of them cannot be specified although the communication for radio tag search has successfully be done, the flow advances to step S213 to advise the user to move the subject to a position where other radio tags have less influence or increase the radio tag reception signal by moving the photographing apparatus 101 close to the subject, thereby leading the user to appropriate photographing. In this way, processing for performing image sensing processing when the communication has successfully been done in the half-pressed state or advising processing when the communication has failed may recursively be done.

The release of the photographing button may be inhibited without warning the user in step S212 or S213, though it is not user-friendly.

As described above, both photographing of a subject having a radio tag and acquisition of radio tag information can be executed by a series of simple operations. In the above example, the image sensing operation is executed after radio tag information has successfully be acquired. However, these operations may be executed almost simultaneously (almost in parallel).

Second Embodiment

In the first embodiment, the status information of radio tag ID acquisition is obtained while keeping the shutter button pressed halfway, and then, the shutter button is pressed completely. In the second embodiment, the status of radio tag ID acquisition is not output when the shutter button is pressed halfway. Instead, processing from radio tag information transmission search is executed when the shutter button is pressed completely (pressed fully).

Figure 5:
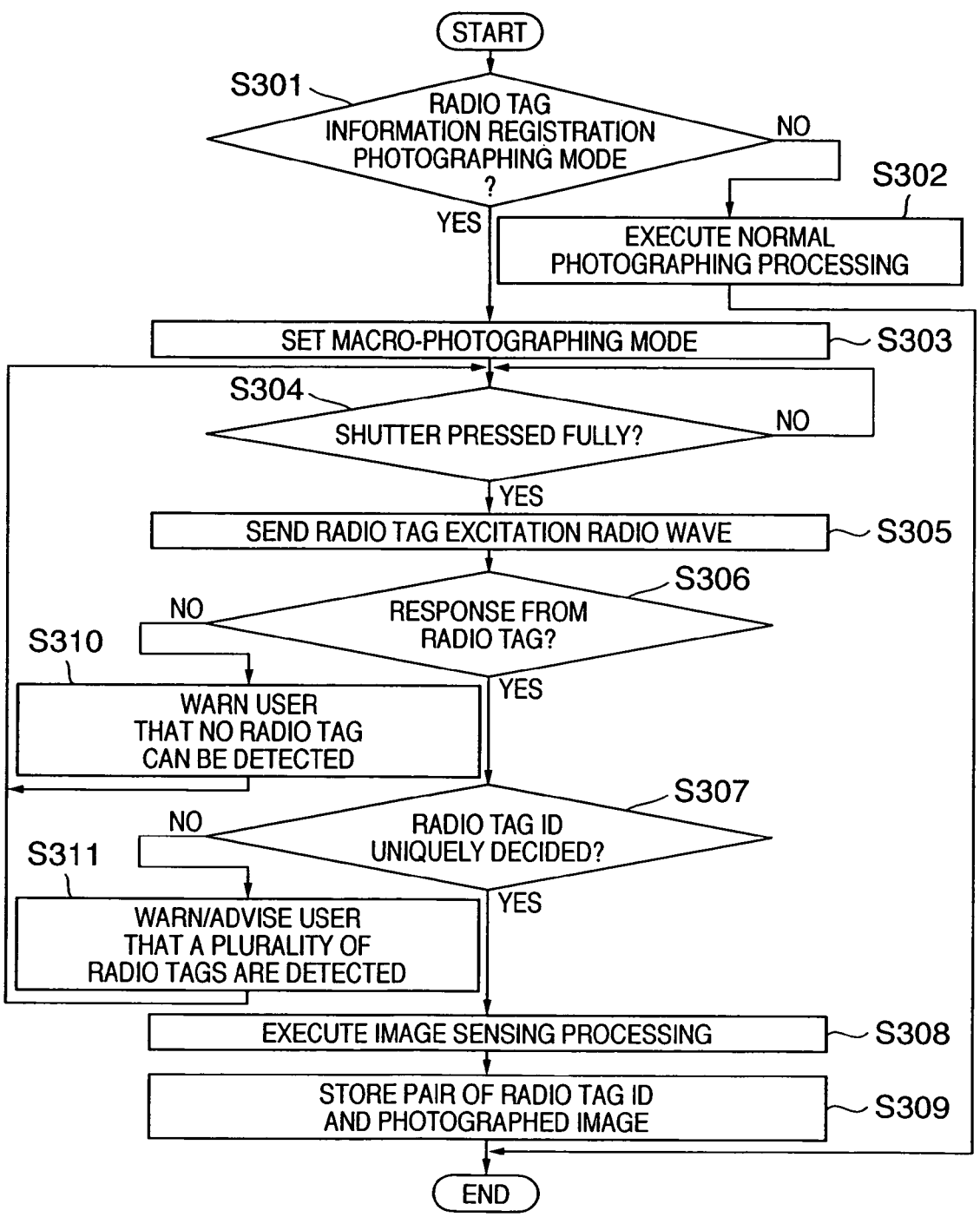
FIG. 5 is a flow chart showing processing executed by a photographing apparatus 101 according to the second embodiment.

Processing executed by a photographing apparatus 101 will be described below with reference to the flow chart shown in FIG. 5. Processing in steps S301 to S303 is the same as the processing in steps S201 to S203 in the flow chart shown in FIG. 3, and a description thereof will be omitted.

When it is detected in step S304 that the photographing button (shutter button) is pressed, a radio tag detector 105 generates, in step S305, a radio wave that excites a radio tag. By the electromotive force, the radio tag transmits radio tag information.

In step S306, it is determined whether a response from the radio tag is received. If YES in step S306, the flow advances to step S307. When only one radio tag information is detected, or when a plurality of pieces of radio tag information are detected, and a radio tag ID signal with the highest signal strength is stronger than a radio tag information signal having the second highest signal strength by a predetermined difference or scaling factor or more so that the radio tag information with the highest signal strength can be specified, it is determined that the radio tag ID can uniquely be decided, and the communication for radio tag search has been done successfully. In this case, as described above, even when a plurality of tags are simultaneously detected, it may also be determined that the communication has been done successfully if it is found that the radio tags belong to, e.g., the same group determined in advance.

When it is determined in step S307 that the communication for radio tag search has been done successfully, the flow advances to step S308 to immediately execute image sensing processing. In step S309, the radio tag information and the obtained image information are set in an information format, in which they are paired, and stored. Accordingly, both photographing of a subject and acquisition of radio tag information can be executed by a series of operations.

When it is determined in step S306 that the acquisition of radio tag information has failed, the flow advances to step S310 to warn the user by screen display, sound, or light that no radio tag information can be detected.

If, in step S307, a plurality of tags are detected, and one of them cannot be specified although the communication for radio tag search has successfully be done, the flow advances to step S311 to warn the user by using screen display, sound, or light that there are a plurality of radio tags.

As a user-friendly method, in step S310, the user is warned by screen display, sound, or light to change the conditions for radio tag detection and execute photographing again. In step S311, the user may be advised to increase the radio tag reception signal by moving the subject to a position where other radio tags have less influence or moving the photographing apparatus close to the subject.

The release of the shutter button may be inhibited without warning the user in step S310 or S311, though it is not user-friendly.

Third Embodiment

In the first and second embodiments, a radio tag excitation radio wave is sent in accordance with the state of the shutter button. In the third embodiment, a radio tag excitation radio wave is sent when a radio tag information registration photographing mode is set.

Figure 6:
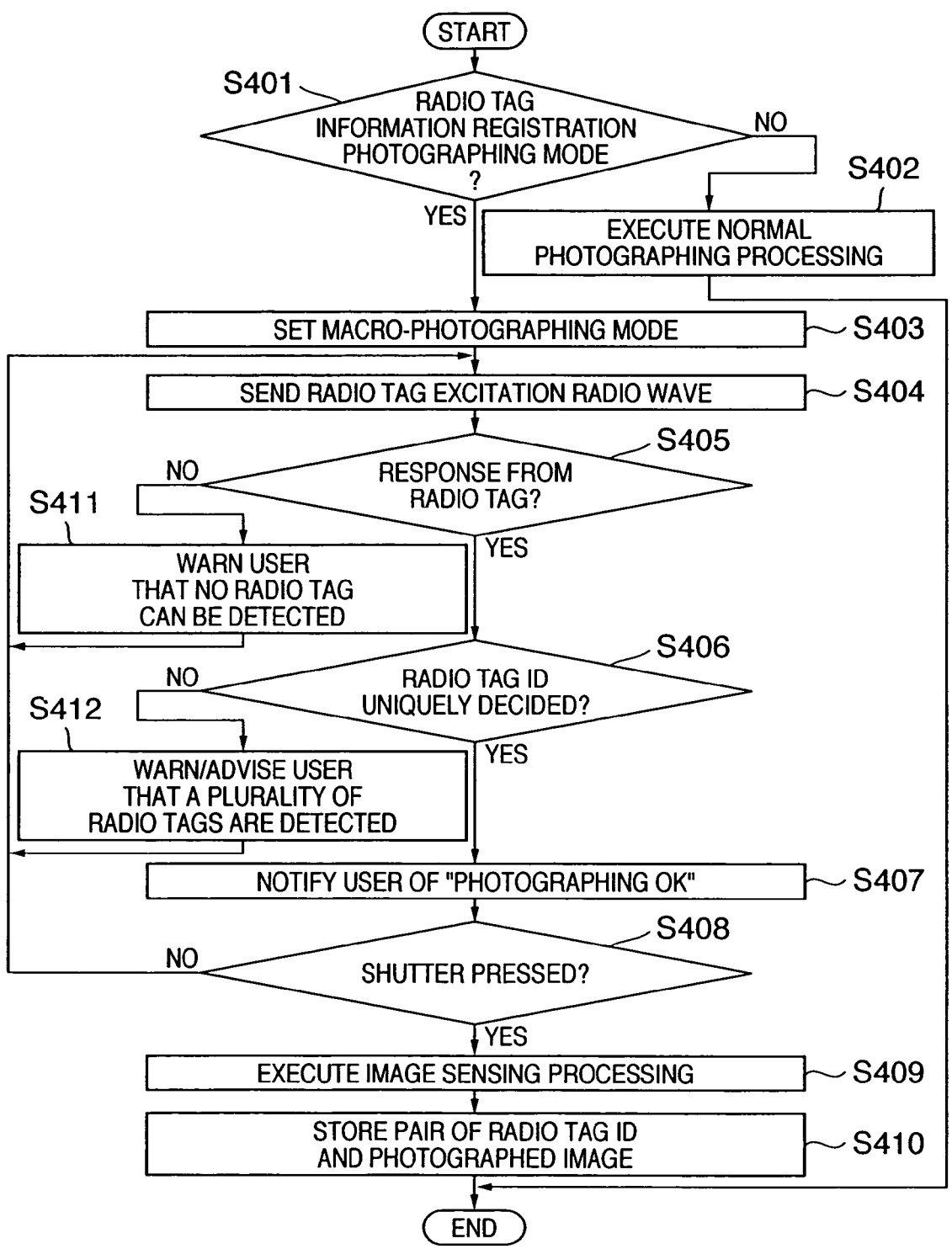
FIG. 6 is a flow chart showing processing executed by a photographing apparatus 101 according to the third embodiment.

Processing executed by a photographing apparatus 101 will be described below with reference to the flow chart shown in FIG. 6. Processing in steps S401 to S403 is the same as the processing in steps S201 to S203 in the flow chart shown in FIG. 3, and a description thereof will be omitted.

In step S404, a radio tag detector 105 generates a radio wave that excites a radio tag. By the electromotive force, the radio tag transmits radio tag information.

In step S405, it is determined whether a response from the radio tag is received. If YES in step S405, the flow advances to step S406. When only one radio tag information is detected, or when a plurality of pieces of radio tag information are detected, and a radio tag ID signal with the highest signal strength is stronger than a radio tag information signal having the second highest signal strength by a predetermined difference or scaling factor or more so that the radio tag information with the highest signal strength can be specified, it is determined that the radio tag ID can uniquely be decided, and the communication for radio tag search has been done successfully. Even when a plurality of radio tags are detected, it may also be determined that the communication has been done successfully if the tags belong to a specific group determined in advance.

When it is determined in step S406 that the communication for radio tag search has been done successfully, the flow advances to step S407 to show the status "photographing OK" by, e.g., turning on a green lamp in the viewfinder or on the main body, displaying the status on the liquid crystal display section, or outputting a warning message of voice.

When it is detected in step S408 that the photographing button (shutter button) is pressed, image sensing processing is executed in step S409. In step S410, the radio tag information and the obtained image information are set in an information format, in which they are paired, and stored. If the photographing button (shutter button) is not immediately pressed in step S408, the situation may have changed. The flow returns to step S404 to execute again the radio tag information transmission search processing.

As described above, the user can grasp the radio tag information detection state and execute processing depending on whether the radio tag detection has successfully be done.

When it is determined in step S405 that the acquisition of radio tag information has failed, the flow advances to step S411 to warn the user by screen display, sound, or light. An example of the warning contents is that no radio tag information can be detected or there are a plurality of radio tag information sources. As a user-friendly method, when no radio tag information is detected, the user is warned by screen display, sound, or light to change the conditions for radio tag detection and execute photographing again.

If, in step S406, a plurality of tags are detected, and a radio tag cannot uniquely be specified although the communication for radio tag search has successfully be done, the flow advances to step S412 to advise the user to move the subject to a position where other radio tags have less influence or increase the radio tag reception signal by moving the photographing apparatus 101 close to the subject, thereby leading the user to appropriate photographing. In this way, processing for performing image sensing processing when the communication has successfully been done in the half-pressed state or advising processing when the communication has failed may recursively be done.

The release of the photographing button may be inhibited without warning the user in step S411 or S412, though it is not user-friendly.

As described above, both photographing of a subject having a radio tag and acquisition of radio tag information can be executed by a series of simple operations.

In this embodiment, the radio tag excitation radio wave is sent in step S404. As a timing, the excitation ratio wave may be continuously sent after the radio tag information registration photographing mode is set (step S401), though power is consumed.

Fourth Embodiment

In the first to third embodiments, the radio tag incorporates no independent power supply and requires a radio wave that excites power. In the fourth embodiment, an example will be described in which a radio tag itself has an internal power supply and transmits radio tag information. In this case, to suppress power consumption of the internal power supply of the radio tag, the radio tag is powered on when it is touched. Alternatively, the radio tag is set in a standby state in a low power consumption mode to wait for an external instruction. When an external instruction is received, an instruction is given to the radio tag to execute communication within a predetermined time, a predetermined number of times of communications, or a predetermined number of times of communications within a predetermined time. With this instruction, the radio tag is caused to transmit radio tag information so that communication for radio tag search is executed.

Figure 7:
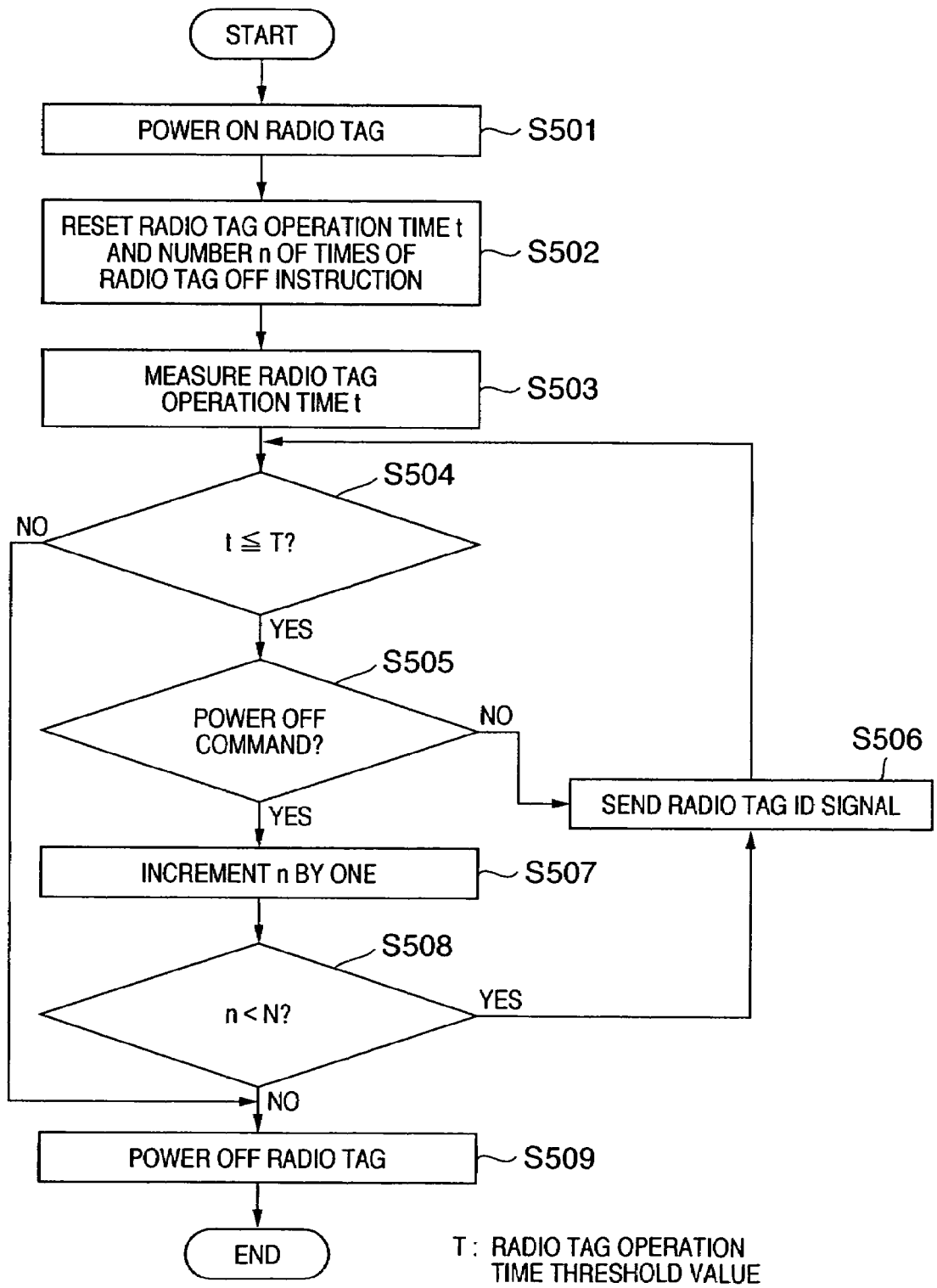
FIG. 7 is a flow chart showing processing executed by a radio tag according to the fourth embodiment.

FIG. 7 shows processing executed by a radio tag which executes a predetermined number of times of communications within a predetermined time. In step S501, a radio tag is touched, or an instruction is received to power on the radio tag. In step S502, a radio tag operation time t and a number n of times of radio tag OFF instruction reception are reset to zero.

In step S503, the radio tag operation time t is measured. In step S504, it is determined whether the radio tag operation time t is equal to or less than an operation time threshold value T determined in advance. When the radio tag operation time t exceeds the operation time threshold value T, the flow advances to step S509 to power off the radio tag.

If the radio tag operation time t is equal to or less than the operation time threshold value T, the flow advances to step S505 to determine whether a power OFF command is communicated. If NO in step S505, a radio tag ID signal is sent in step S506, and the flow returns to processing in step S504. If YES in step S505, the number n of times of radio tag OFF instruction reception is incremented by one in step S507. In step S508, the number n of times of radio tag OFF instruction reception is compared with a threshold value N of the number of times of radio tag OFF instruction reception. If the number n of times of radio tag OFF instruction reception is smaller than N, a radio tag ID signal is sent in step S506. If the number n of times of radio tag OFF instruction reception is equal to or larger than N, the radio tag is powered off in step S509.

In the above-described example, a predetermined number of times of communications are executed within a predetermined time. However, communication within a predetermined time or a predetermined number of times of communications may be executed.

Figure 8:
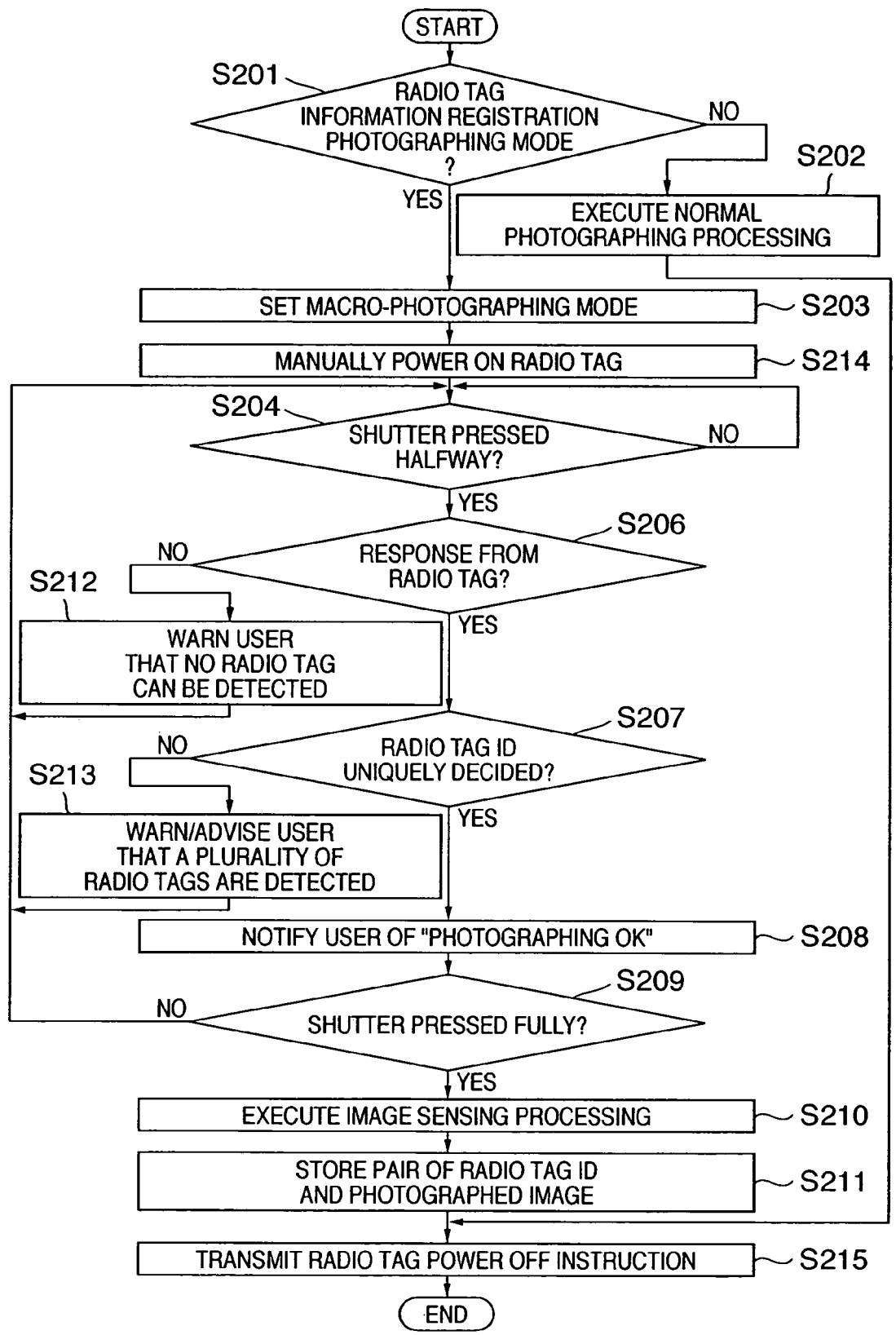
FIG. 8 is a flow chart showing an example of processing executed by a photographing apparatus 101 according to the fourth embodiment.

FIG. 8 is a flow chart showing processing when the radio tag itself has an internal power supply and transmits radio tag information in the example described in the first embodiment. The same step number as in the flow chart described in FIG. 3 denote the same processing operations in FIG. 8, and a detailed description thereof will be omitted.

In this case, processing for powering on the radio tag by touching it (step S214) is added before step S204, and radio tag excitation radio wave sending processing (step S205) is omitted. In addition, processing for transmitting an instruction for powering off the radio tag (step S215) is added after step S211.

As described above, when the processing shown in the flow chart of FIG. 8 is executed by a photographing apparatus 101, and the processing shown in the flow chart of FIG. 7 is executed on the radio tag side, the processing can be executed while suppressing power consumption of the internal power supply of the radio tag.

Figure 9:
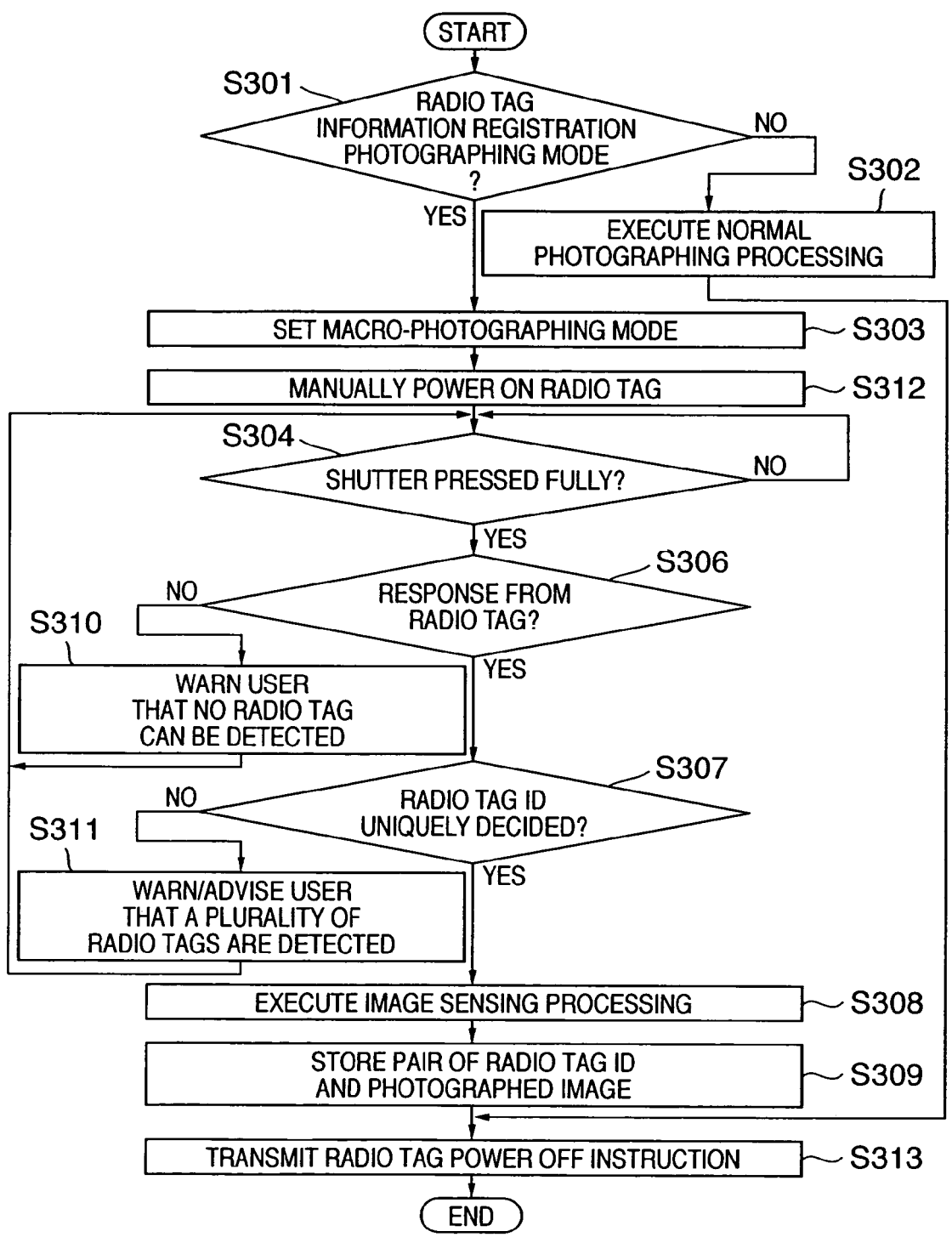
FIG. 9 is a flow chart showing another example of processing executed by the photographing apparatus 101 according to the fourth embodiment.

FIG. 9 is a flow chart showing processing when the radio tag itself has an internal power supply and transmits radio tag information in the example described in the second embodiment. The same step number as in the flow chart described in FIG. 5 denote the same processing operations in FIG. 9, and a detailed description thereof will be omitted.

In this case, processing for powering on the radio tag by touching it (step S312) is added before step S304, and radio tag excitation radio wave sending processing (step S305) is omitted. In addition, processing for transmitting an instruction for powering off the radio tag (step S313) is added after step S309.

As described above, when the processing shown in the flow chart of FIG. 9 is executed by the photographing apparatus 101, and the processing shown in the flow chart of FIG. 7 is executed on the radio tag side, the processing can be executed while suppressing power consumption of the internal power supply of the radio tag.

The timing for manually powering on the radio tag is not limited to that shown in FIG. 8 or 9. Any other timing before the processing for detecting that the shutter button is pressed halfway or fully can be employed.

Figure 10:
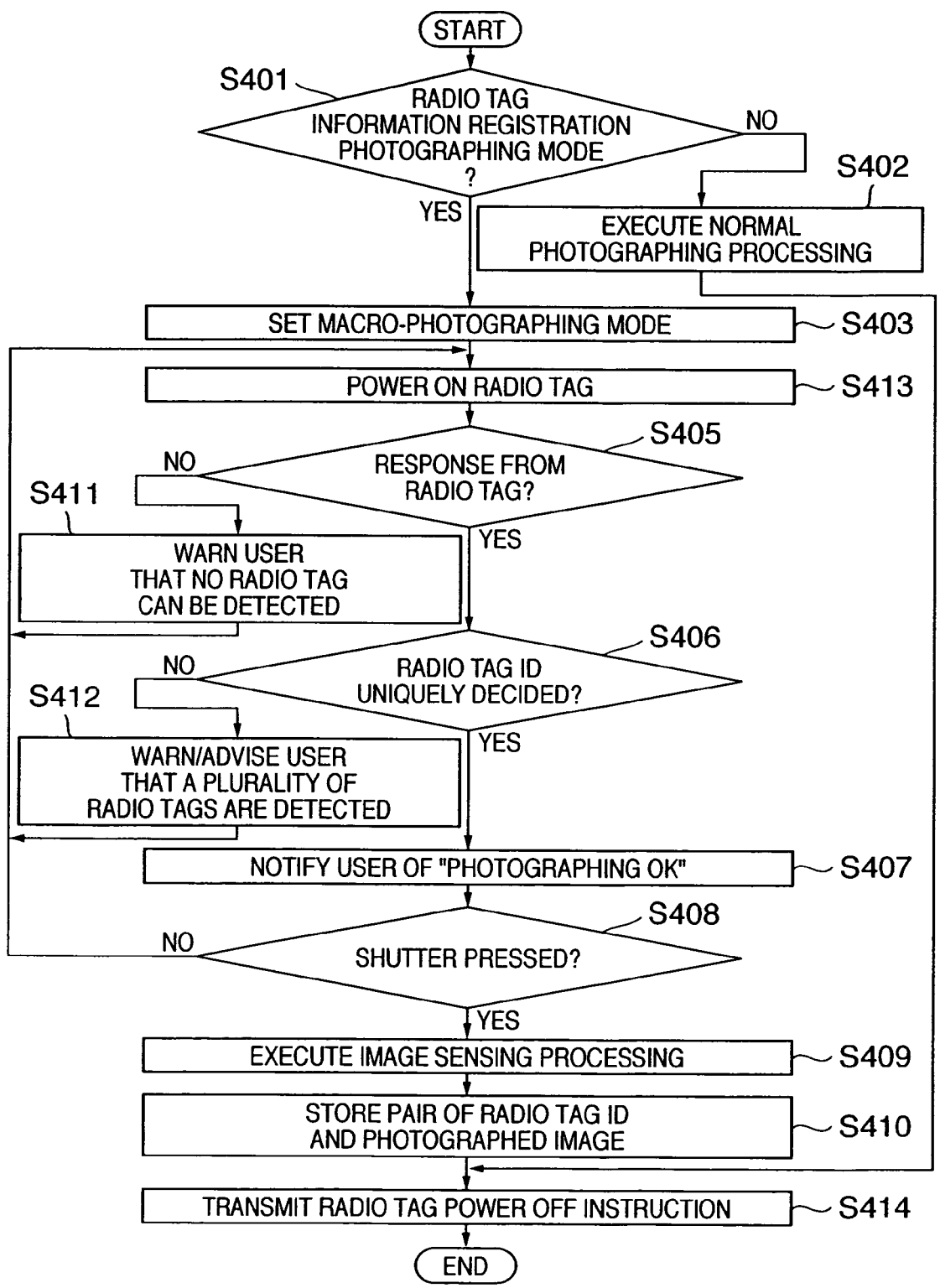
FIG. 10 is a flow chart showing still another example of processing executed by the photographing apparatus 101 according to the fourth embodiment.

FIG. 10 is a flow chart showing processing when the radio tag itself has an internal power supply and transmits radio tag information in the example described in the third embodiment. The same step number as in the flow chart described in FIG. 6 denote the same processing operations in FIG. 10, and a detailed description thereof will be omitted.

In this case, processing for powering on the radio tag by touching it (step S413) is added before step S405, and radio tag excitation radio wave sending processing (step S404) is omitted. In addition, processing for transmitting an instruction for powering off the radio tag (step S414) is added after step S410.

As described above, when the processing shown in the flow chart of FIG. 10 is executed by the photographing apparatus 101, and the processing shown in the flow chart of FIG. 7 is executed on the radio tag side, the processing can be executed while suppressing power consumption of the internal power supply of the radio tag.

In the examples described in above embodiments, the user manually switches the photographing mode to the radio tag information registration photographing mode. However, when a subject is captured for photographing by the image sensing system, the photographing button is pressed halfway to search for a radio tag, and the communication for radio tag search has successfully be done, the radio tag information registration photographing mode may automatically be set. If the communication has failed, the normal photographing mode may automatically be set.

As described above, the photographing apparatus 101 has the radio tag detector 105 so that both photographing and radio tag detection can simultaneously efficiently be executed. The subject can be photographed almost simultaneously as the apparatus 101 is moved close to the subject to detect the tag ID so that the tag ID and image information can be paired and managed. In addition, the radio tag is detected immediately before photographing. Hence, any photographing error or wasteful photographing, in which, e.g., only the subject is photographed without acquiring the radio tag information, can be prevented.

It is advantageous to store a pair of a radio tag ID and a photographed image. The reason for this is as follows. Although a radio tag ID is made of a symbol string that is insignificant for persons, an image readily remains in their memory. When a photographed image that is paired with a radio tag ID is used as a symbol, i.e., an icon that represents the radio tag ID, it is greatly useful as a UI or GUI for designating the radio tag ID.

In the above-described first to fourth embodiments, one photographing apparatus has a radio tag detector and photographing unit. However, an apparatus having a radio tag detector and another apparatus having a photographing unit, which have functions of communicating with each other, may be prepared. The operation section of the apparatus with the photographing unit is operated to cause the photographing unit to photograph a subject and the radio tag detector to receive a radio tag ID. The radio tag ID and photographed image may be paired and stored in the apparatus having the photographing unit or an external memory device by using the communication function. Alternatively, the operation section on the side of the apparatus with the radio tag detector is operated to cause the photographing unit to photograph a subject and the radio tag detector to receive a radio tag ID. The radio tag ID and photographed image may be paired and stored in the apparatus having the radio tag detector or an external memory device by using the communication function.

As described above, according to the first to fourth embodiments, photographing of a subject and acquisition of radio tag information can easily be implemented.

Fifth Embodiment

The fifth embodiment will be described next. The apparatus arrangement is the same as in FIGS. 1A, 1B, and 2. The same reference numerals as in FIGS. 1A, 1B, and 2 denote the same constituent elements in the fifth embodiment.

Figure 11:
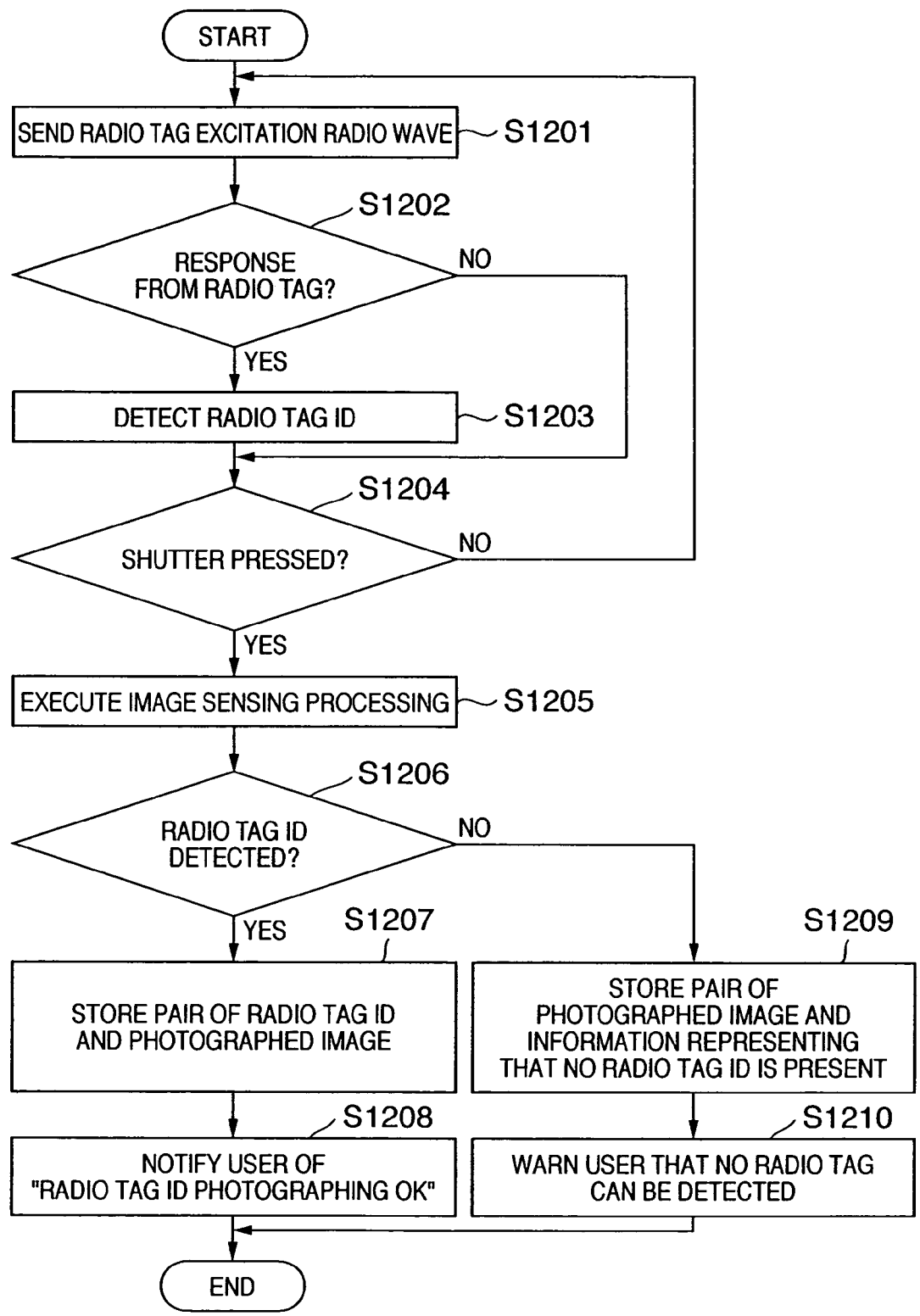
FIG. 11 is a flow chart showing processing executed by a photographing apparatus 101 according to the fifth embodiment.

Processing executed by a photographing apparatus 101 will be described with reference to the flow chart shown in FIG. 11.

In step S1201, a radio tag detector 105 generates a radio wave that excites a radio tag. By the electromotive force, the radio tag transmits radio tag information.

In step S1202, it is determined whether a response from the radio tag is received. If YES in step S1202, the flow advances to step S1203 to immediately detect radio tag information. Then, the flow advances to step S1204. In step S1203, when only one radio tag information or a plurality of pieces of radio tag information are detected, it is determined that radio tag information detection has successfully been done. When a plurality of pieces of radio tag information are detected, the order of signal strengths is also temporarily stored.

If NO in step S1202, the flow directly advances to step S1204. In this case, the user may be notified that no response from the radio tag is received.

When it is detected in step S1204 that the photographing button (shutter button) is pressed, image sensing processing is executed in step S1205.

In this case, if radio tag information is acquired by the processing in step S1203 (step S1206), the radio tag information and obtained image information are set in an information format, in which they are paired, and stored in step S1207. In step S1208, the user is notified that the radio tag information and obtained image information are set in the information format, in which they are paired, and stored. For this notification, the status "radio tag information acquisition OK" is indicated by, e.g., turning on a green lamp in the viewfinder or on the main body, displaying the status on the liquid crystal display section, or outputting a warning message of voice. When there are a plurality of pieces of radio tag information, the user may be notified of the number of pieces of radio tag information and the value of each radio tag information.

If no radio tag information is acquired (step S1206), information representing that no radio tag information is detected and obtained image information are set in an information format, in which they are paired, and stored in step S1209. To notify the user of this, the status "radio tag information acquisition NG" is indicated by, e.g., turning on a green lamp in the viewfinder or on the main body, displaying the status on the liquid crystal display section, or outputting a warning message of voice. Accordingly, when the user wants to obtain an image with radio tag information, he/she can retry to photograph the subject.

As an information schema that stores pairs of information, for example, a database DB shown in FIG. 12 is used. A DB record stores not only radio tag ID information, a list of signal strengths, and a pointer to that image but also metadata that can automatically be acquired, including an image size (vertical and horizontal sizes or the number of bytes), an image ID uniquely assigned to the image, and a date. The pointer to the image can be the address of the image storage destination or the path information of the image file. The schema may store the image data itself in place of the pointer to the image.

As described above, both photographing of a subject having a radio tag and acquisition of radio tag information can be executed by a series of simple operations. In addition, storage processing can be executed in accordance with whether radio tag information can be acquired.

Sixth Embodiment

In the fifth embodiment, radio tag information is searched for before the photographing button is pressed. In the sixth embodiment, however, radio tag information is searched for after the photographing button is pressed.

Figure 13:
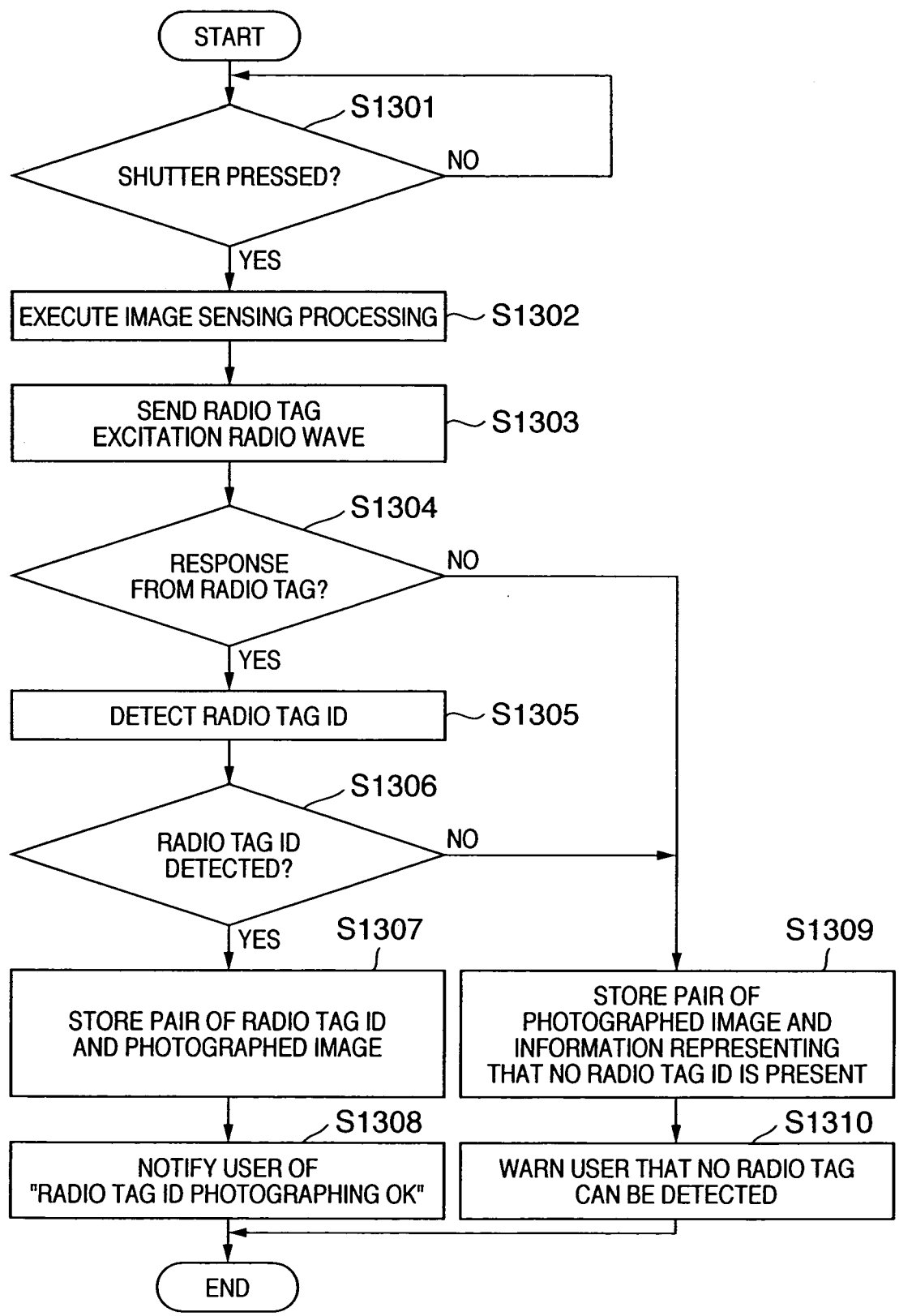
FIG. 13 is a flow chart showing processing executed by a photographing apparatus 101 according to the sixth embodiment.

Processing executed by a photographing apparatus 101 will be described below with reference to the flow chart shown in FIG. 13. In step S1301, it is determined whether the photographing button (shutter button) is pressed. The processing loops and waits until the photographing button is pressed.

When it is detected that the photographing button (shutter button) is pressed, image sensing processing is executed in step S1302. In step S1303, a radio tag detector 105 generates a radio wave that excites a radio tag. By the electromotive force, the radio tag transmits radio tag information.

In step S1304, it is determined whether a response from the radio tag is received. If YES in step S1304, the flow advances to step S1305 to immediately detect radio tag information. Then, the flow advances to step S1306. In step S1305, when only one radio tag information or a plurality of pieces of radio tag information are detected, it is determined that radio tag information detection has successfully been done. When a plurality of pieces of radio tag information are detected, the order of signal strengths is also temporarily stored.

If NO in step S1304, the flow directly advances to step S1309. In this case, the user may be notified that no response from the radio tag is received.

If radio tag information is acquired by the processing in step S1305 (step S1306), the radio tag information and obtained image information are set in an information format, in which they are paired, and stored in step S1307. In step S1308, the user is notified that the radio tag information and obtained image information are set in the information format, in which they are paired, and stored. For this notification, the status "radio tag information acquisition OK" is indicated by, e.g., turning on a green lamp in the viewfinder or on the main body, displaying the status on the liquid crystal display section, or outputting a warning message of voice. When there are a plurality of pieces of radio tag information, the user may be notified of the number of pieces of radio tag information and the value of each radio tag information.

If no radio tag information is acquired (step S1306), information representing that no radio tag information is detected and obtained image information are set in an information format, in which they are paired, and stored in step S1309. To notify the user of this, the status "radio tag information acquisition NG" is indicated by, e.g., turning on a green lamp in the viewfinder or on the main body, displaying the status on the liquid crystal display section, or outputting a warning message of voice.

As described above, both photographing of a subject having a radio tag and acquisition of radio tag information can be executed by a series of simple operations. In addition, storage processing can be executed in accordance with whether radio tag information can be acquired.

In this embodiment, from the viewpoint of photographing response, image sensing processing is executed immediately after the shutter button is pressed. After that, sending of the radio tag excitation radio wave and acquisition of radio tag information are executed. However, sending of the radio tag excitation radio wave and acquisition of radio tag information may be executed immediately after the shutter button is pressed. Then, image sensing processing may be executed.

Seventh Embodiment

In the fifth and sixth embodiments, the radio tag incorporates no independent power supply and requires a radio wave that excites power. In the seventh embodiment, an example will be described in which a radio tag itself has an internal power supply and transmits radio tag information. In this case, to suppress power consumption of the internal power supply of the radio tag, the radio tag is powered on when it is touched. An instruction is given to the radio tag to execute communication within a predetermined time, a predetermined number of times of communications, or a predetermined number of times of communications within a predetermined time. With this instruction, the radio tag is caused to transmit radio tag information so that communication for radio tag search is executed.

Figure 14:
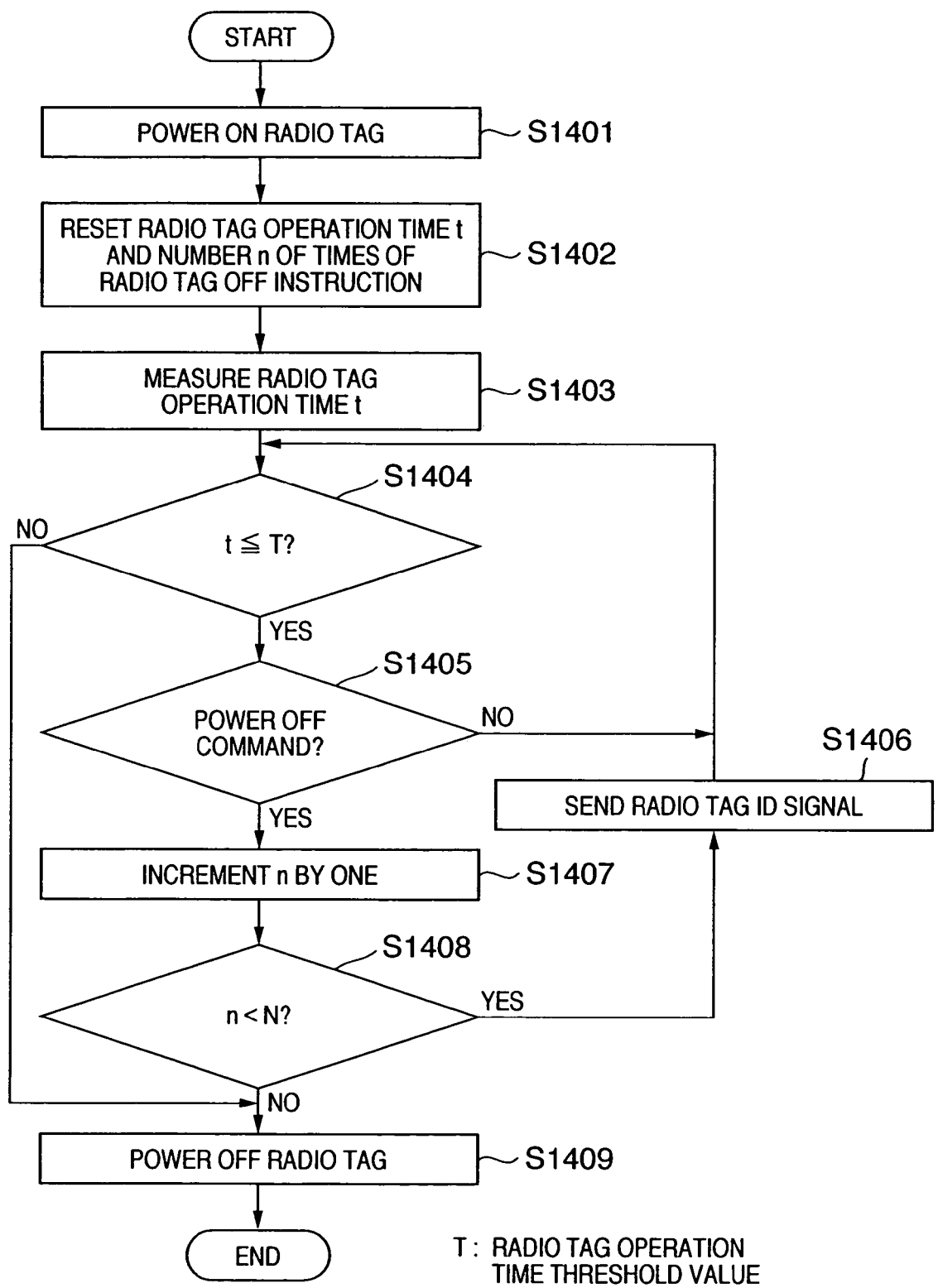
FIG. 14 is a flow chart showing processing executed by a radio tag according to the seventh embodiment.

FIG. 14 shows processing executed by a radio tag which executes a predetermined number of times of communications within a predetermined time. In step S1401, a radio tag is touched to power on the radio tag. In step S1402, a radio tag operation time t and a number n of times of radio tag OFF instruction reception are reset to zero.

In step S1403, the radio tag operation time t is measured. In step S1404, it is determined whether the radio tag operation time t is equal to or less than an operation time threshold value T determined in advance. When the radio tag operation time t exceeds the operation time threshold value T, the flow advances to step S1409 to power off the radio tag.

If the radio tag operation time t is equal to or less than the operation time threshold value T, the flow advances to step S1405 to determine whether a power OFF command is communicated. If NO in step S1405, a radio tag ID signal is sent in step S1406, and the flow returns to processing in step S1404. If YES in step S1405, the number n of times of radio tag OFF instruction reception is incremented by one in step S1407. In step S1408, the number n of times of radio tag OFF instruction reception is compared with a threshold value N of the number of times of radio tag OFF instruction reception. If the number n of times of radio tag OFF instruction reception is smaller than N, a radio tag ID signal is sent in step S1406. If the number n of times of radio tag OFF instruction reception is equal to or larger than N, the radio tag is powered off in step S1409.

In the above-described example, a predetermined number of times of communications are executed within a predetermined time. However, communication within a predetermined time or a predetermined number of times of communications may be executed.

Figure 15:
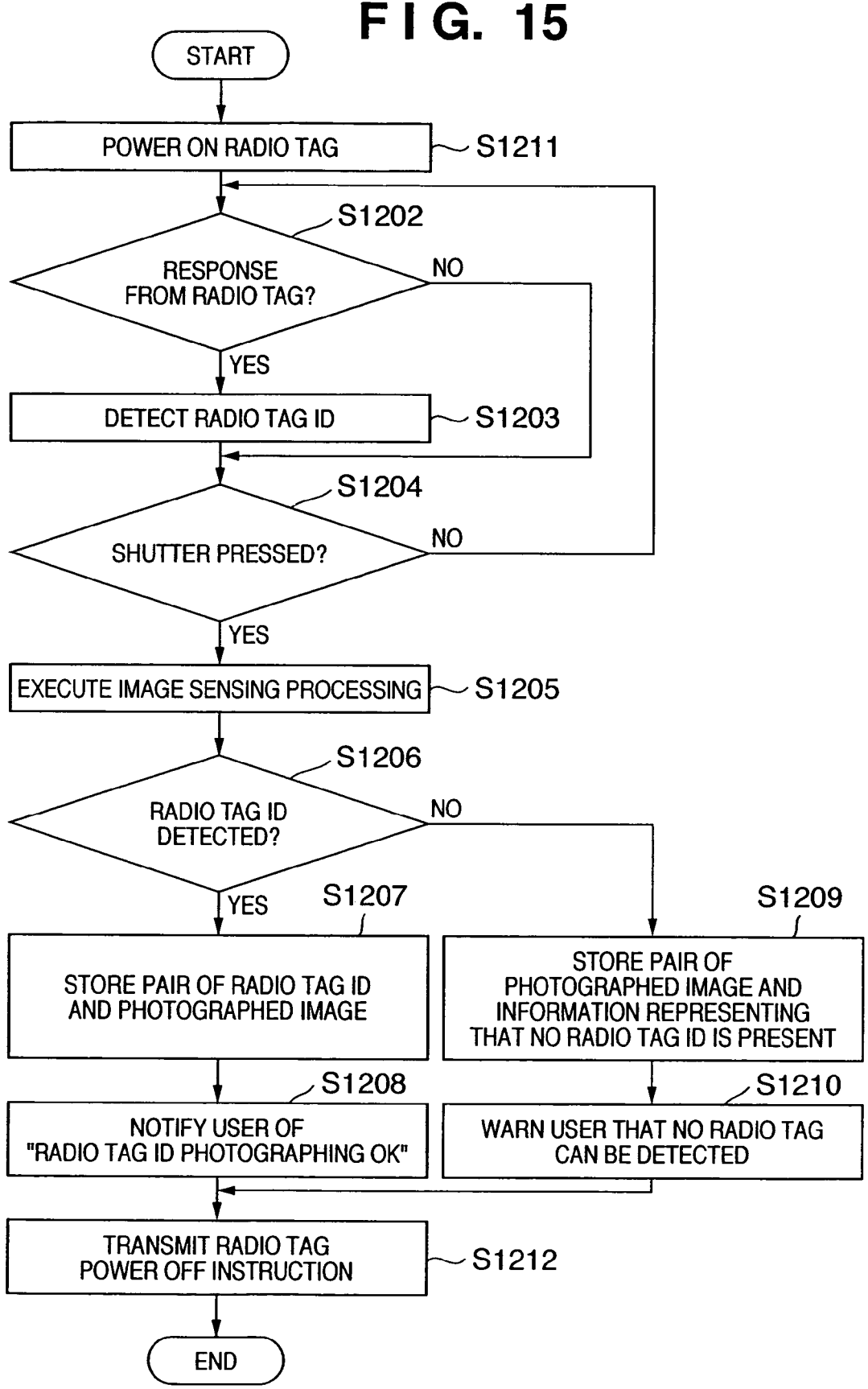
FIG. 15 is a flow chart showing an example of processing executed by a photographing apparatus 101 according to the seventh embodiment.

FIG. 15 is a flow chart showing processing when the radio tag itself has an internal power supply and transmits radio tag information in the example described in the fifth embodiment. The same step number as in the flow chart described in FIG. 3 denote the same processing operations in FIG. 15, and a detailed description thereof will be omitted.

In this case, processing for powering on the radio tag by touching it (step S1211) is added in place of the radio tag excitation radio wave sending processing (step S1205). In addition, processing for transmitting an instruction for powering off the radio tag (step S1212) is added after steps S1208 and S1209.

As described above, when the processing shown in the flow chart of FIG. 15 is executed by a photographing apparatus 101, and the processing shown in the flow chart of FIG. 14 is executed on the radio tag side, the processing can be executed while suppressing power consumption of the internal power supply of the radio tag.

Similarly, when the radio tag itself has an internal power supply and transmits radio tag information in the example described in the sixth embodiment, processing for powering on the radio tag by touching it is added in place of the radio tag excitation radio wave sending processing (step S1303). In addition, processing for transmitting an instruction for powering off the radio tag is added after steps S1308 and S1310.

As described above, the photographing apparatus 101 has a radio tag detector 105 so that both photographing and radio tag detection can simultaneously efficiently be executed. The subject can be photographed almost simultaneously as the apparatus 101 is moved close to the subject to detect the tag ID so that the tag ID and image information can be paired and managed. In addition, the radio tag is detected immediately before photographing. Hence, any error, in which, e.g., only the subject is photographed without acquiring the radio tag information, can be prevented.

It is advantageous to store a pair of a radio tag ID and an photographed image. The reason for this is as follows. Although a radio tag ID is made of a symbol string that is insignificant for persons, an image readily remains in their memory. When a photographed image that is paired with a radio tag ID is used as a symbol, i.e., an icon that represents the radio tag ID, it is greatly useful as a UI or GUI for designating the radio tag ID.

In the above embodiments, when no radio tag information is acquired, a warning is output (step S1210 or S1310). However, when no radio tag information is detected, it may be regarded as normal photographing, and output of a warning may be omitted.

As described above, according to the fifth to seventh embodiments, both photographing of a subject and acquisition of radio information can simultaneously easily be executed. In addition, storage processing can be executed in accordance with whether radio information can be acquired.

Eighth Embodiment

The eighth embodiment will be described next. The apparatus arrangement is the same as in FIGS. 1A, 1B, and 2. The same reference numerals as in FIGS. 1A, 1B, and 2 denote the same constituent elements in the eighth embodiment.

Figure 16:
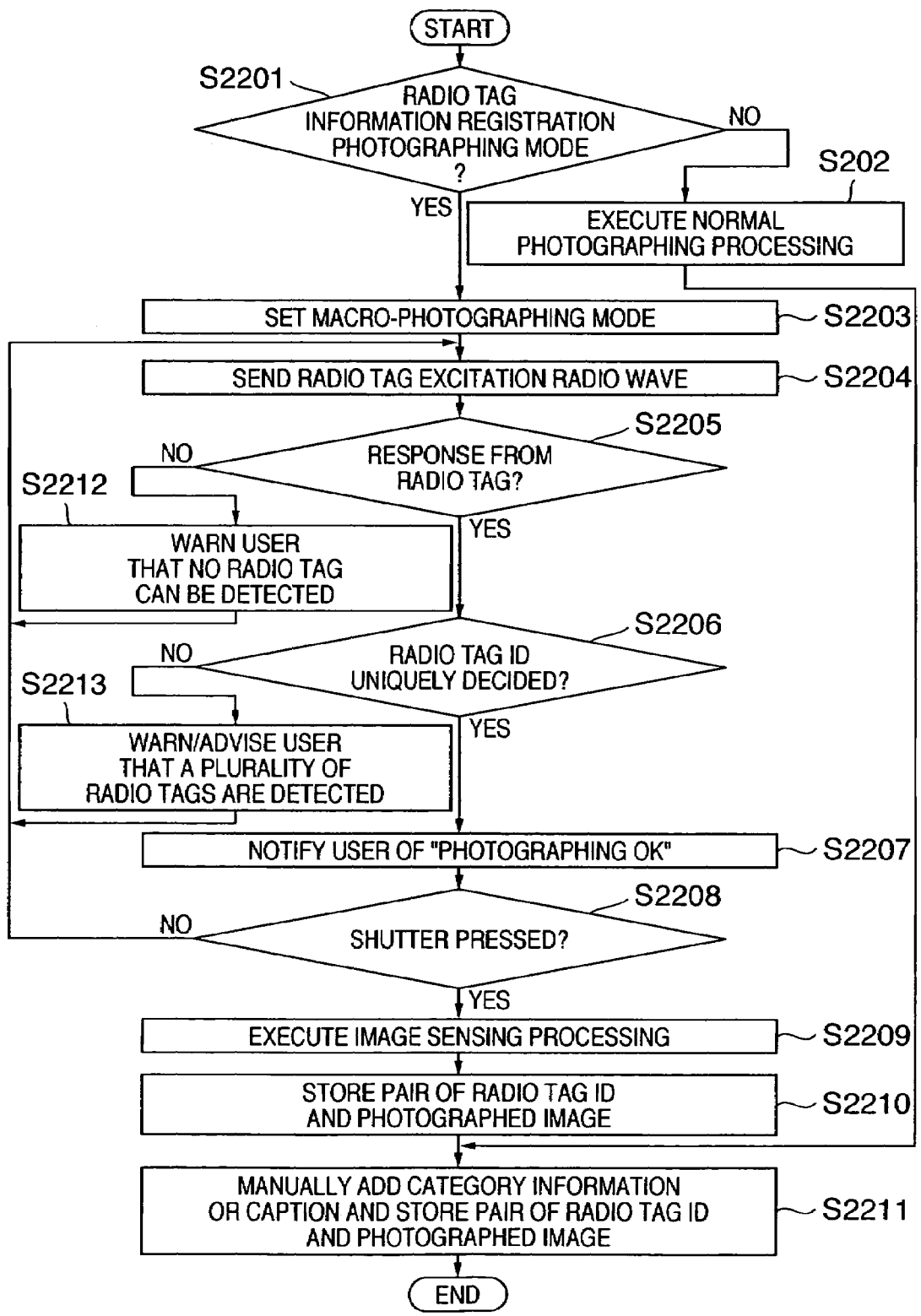
FIG. 16 is a flow chart showing registration processing executed by a photographing apparatus 101 according to the eighth embodiment.

Registration processing executed by a photographing apparatus 101 according to the eighth embodiment will be described with reference to the flow chart shown in FIG. 16.

In step S2201, it is determined whether the mode selected by the user is a normal photographing mode or radio tag information registration photographing mode. To select a mode, the photographing mode may be set first, and then in that state, the mode may be switched by using another switch different from the photographing mode switch. Alternatively, the normal photographing mode and radio tag information registration photographing mode may be prepared as choices on a rotary photographing mode selection switch that is used to select an automatic or manual photographing mode in a normal camera.

When the normal photographing mode is selected in step S2201, photographing processing is executed in step S2202 without executing any processing related to the radio tag. Image data and automatically obtained metadata such as a date are stored. That is, the function of the radio tag detector is not concerned with the normal photographing mode. The processing is the same as normal photographing, and a detailed description thereof will be omitted.

On the other hand, when the radio tag information registration photographing mode is selected in step S2201, the flow advances to step S2203 to automatically switch the image sensing system to the macro-photographing mode. The subject having a radio tag is considered to be near the photographing apparatus 101. Hence, when the photographing mode is automatically switched to the macro-photographing mode, the load on the user can be reduced.

In step S2204, a radio tag detector 105 sends a radio wave that excites the radio tag. By the electromotive force, the radio tag transmits radio tag information.

In step S2205, it is determined whether a response from the radio tag is received. If YES in step S2205, the flow advances to step S2206. When only one radio tag information is detected, or when a plurality of pieces of radio tag information are detected, and a radio tag ID signal with the highest signal strength is stronger than a radio tag information signal having the second highest signal strength by a predetermined difference or scaling factor or more so that the radio tag information with the highest signal strength can be specified, it is determined that the radio tag ID can uniquely be decided, and the communication for radio tag search has been done successfully.

When it is determined in step S2206 that the communication for radio tag search has been done successfully, the flow advances to step S2207 to show the status "photographing OK" by, e.g., turning on a green lamp in the viewfinder or on the main body, displaying the status on the liquid crystal display section, or outputting a warning message of voice.

When it is detected in step S2208 that the photographing button (shutter button) is pressed, image sensing processing is executed in step S2209. In step S2210, the radio tag information and the obtained image information are set in an information format, in which they are paired, and stored. If the photographing button is not pressed within a predetermined time, the situation may have changed. The flow returns to step S2204 to execute again the radio tag information transmission search processing.

As described above, the user can grasp the radio tag information detection state and execute processing depending on whether the radio tag detection has successfully been done.

After the image sensing processing, in step S2211, category information (the attribute of the subject (a category such as "small article", "accessory", "clothing", "human", "animal", or "AV device")) that cannot automatically be acquired or a caption (e.g., the detailed name of the subject) is input to a database record that contains the radio tag information and photographed image. In a cellular phone terminal as an example of the photographing apparatus 101 shown in FIG. 17, "category information" is selected from a menu 605 by scrolling using a cross-shaped cursor key 602. The user can further extend the category items. A caption can freely be input to a keyword field 606. For example, free characters related to the photographing target can be input in a limit number or less by using a known cellular phone character input means. Thus input category information or caption is inserted in the database field and stored in association with the pair of radio tag information and image information.

A character string such as a keyword is input by using keys 604. With these keys, "0" to "9", "#", and "*", which are used to input a normal telephone number, can be input. When a character input mode is designated, alphabets "A" to "Z" and symbols such as a comma and period can be input. There are 12 keys 604. A plurality of characters are assigned to each key. A character to be input is decided by the number of times of pressing a key. For example, when the key "A" is pressed once, character "A" is input. When the key is pressed twice, "B" is input. When the key is pressed three times, "C" is input. When the key is pressed four times, "A" is input again. To input a character string "AA", the key "A" is pressed once to input "A". After the cross-shaped cursor is moved, the key "A" is pressed again. That is, if the cross-shaped cursor key is present, a character input before is confirmed when the cross-shaped cursor key is pressed.

As an information schema that stores pairs of information, for example, a database DB shown in FIG. 18 is used. A database record stores not only radio tag ID information and a pointer to that image but also metadata such as a date that can automatically be acquired and category information or a caption, which is manually added. The pointer to the image can be the address of the image storage destination or the path information of the image file. The schema may store the image data itself in place of the pointer to the image.

When it is determined in step S2205 that the acquisition of radio tag information has failed, the flow advances to step S1212 to warn the user by screen display, sound, or light. An example of the warning contents is that no radio tag information can be detected or there are a plurality of radio tag information sources. As a user-friendly method, when no radio tag information is detected, the user is warned by screen display, sound, or light to change the conditions for radio tag detection and execute photographing again.

If it is determined in step S2206 that the communication for radio tag search has failed, the flow advances to step S2213 to advise the user to move the subject to a position where other radio tags have less influence or increase the radio tag reception signal by moving the photographing apparatus 101 close to the subject, thereby leading the user to appropriate photographing. In this way, processing for performing image sensing processing when the communication has successfully been done in the half-pressed state or advising processing when the communication has failed may recursively be done.

The release of the photographing button may be inhibited without warning the user in step S2212 or S2213, though it is not user-friendly.

As described above, both photographing of a subject having a radio tag and acquisition of radio tag information can be executed by a series of simple operations.

<Determination Processing>

Figure 19:
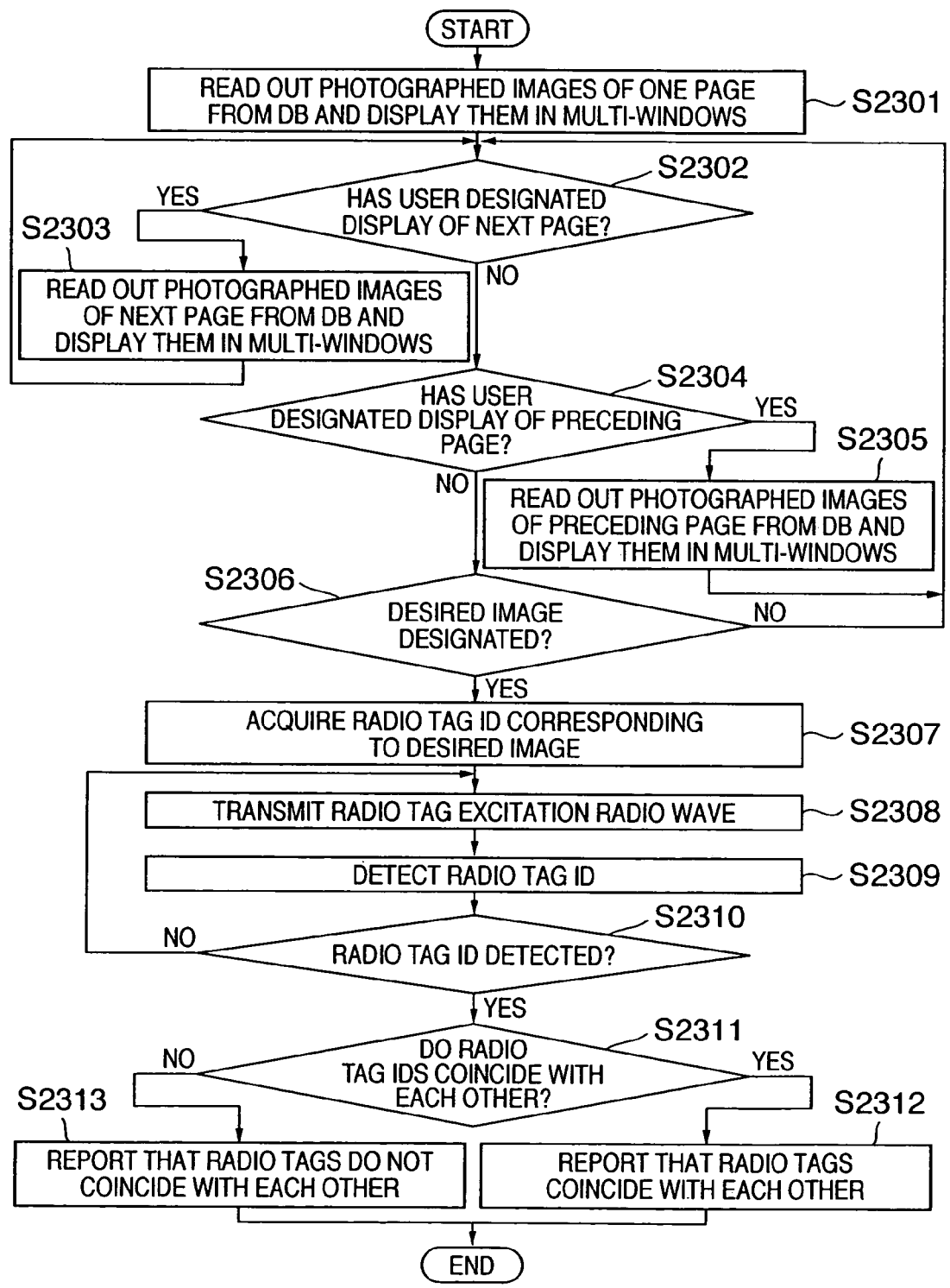
FIG. 19 is a flow chart showing determination processing executed by the photographing apparatus 101 according to the eighth embodiment.

Determination processing executed by the photographing apparatus 101 will be described with reference to the flow chart shown in FIG. 19. An example will be described below, in which when red spectacles (target article) owned by a user are mixed with much alike spectacles, and cannot be recognized, the user's spectacles are found out.

In step S2301, of all images registered in the database DB, photographed images of one page are read out, and their thumbnail images are displayed in multi-windows 601.

If the desired image is not present in the multi-windows 601, the user scrolls the window up or down by using the cross-shaped cursor key 602. When the user designates to display the next page (step S2302) or display the preceding page (step S2304), photographed images of one page, which are not displayed yet, are read out from all the images registered in the database DB, and their thumbnail images are displayed in the multi-windows 601 (step S2303 or S2305).

The user displays candidate images in the above way. When the desired image "red glasses" is present, the OK button at the center of the cross-shaped cursor key 602 is pressed to decide the desired image. In this way, the user designates the desired image (step S2306). The processing in steps S2302, S2304, and S2306 represents an event-driven flow for the illustrative convenience. If the user inputs nothing, the flow continuously loops through steps S2302→S2304→S2306→S2302.

When the thumbnail image of the desired "red glasses" is designated by the user in step S2306, the flow advances to step S2307 to acquire radio tag information paired with the image.

In step S2308, the radio tag detector 105 sends a radio wave that excites the radio tag. By the electromotive force, the radio tag transmits radio tag information.

In steps S2309 and S2310, radio tag information detection processing is executed, and it is determined whether radio tag information is detected. If NO in step S2310, the flow returns to step S2308 to send the radio wave that excites the radio tag. This processing is recursively repeated. At this time, to avoid interference of radio tag signals, the object whose radio tag information should be detected is preferably separated from other objects.

Figure 17:
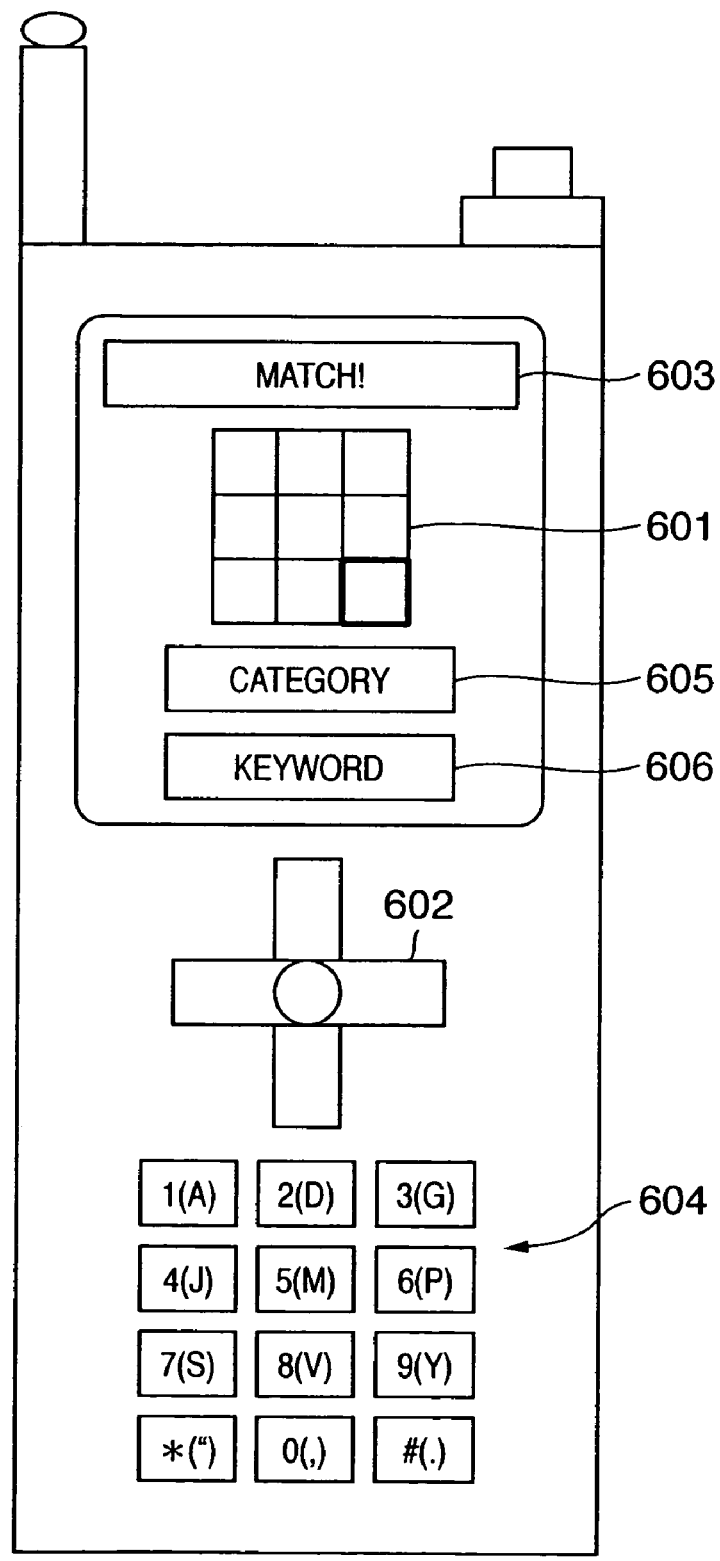
FIG. 17 is a view showing a cellular phone terminal as an example of the photographing apparatus 101.

If YES in step S2310, the flow advances to step S2311 to compare the radio tag information of the "red glasses" with the radio tag information (the value of the tag ID) detected this time. If the two pieces of radio tag information coincide with each other, a message "match!" is displayed in a status display area 603 in step S2312, as shown in FIG. 17. If the two pieces of radio tag information do not coincide with each other, it is reported in step S2313 that they do not coincide with each other.

Instead of displaying the status, a green LED may be turned on for coincidence, and a red LED may be turned on for incoincidence. Alternatively, a voice message "determined as match" or "do not match" may be output.

As described above, when a user's article is mixed with a plurality of articles with alike outer appearances, the tag ID of the radio tag attached to the object is acquired by using the radio tag detector. A tag ID paired with the photographed image is compared with the tag ID of the radio tag attached to the object, thereby distinguishing the article of user's own.

Ninth Embodiment

Determination processing of the eighth embodiment is modified. Registration processing is the same as in the eighth embodiment, and a detailed description thereof will be omitted.

<Determination Processing>

Figure 20:
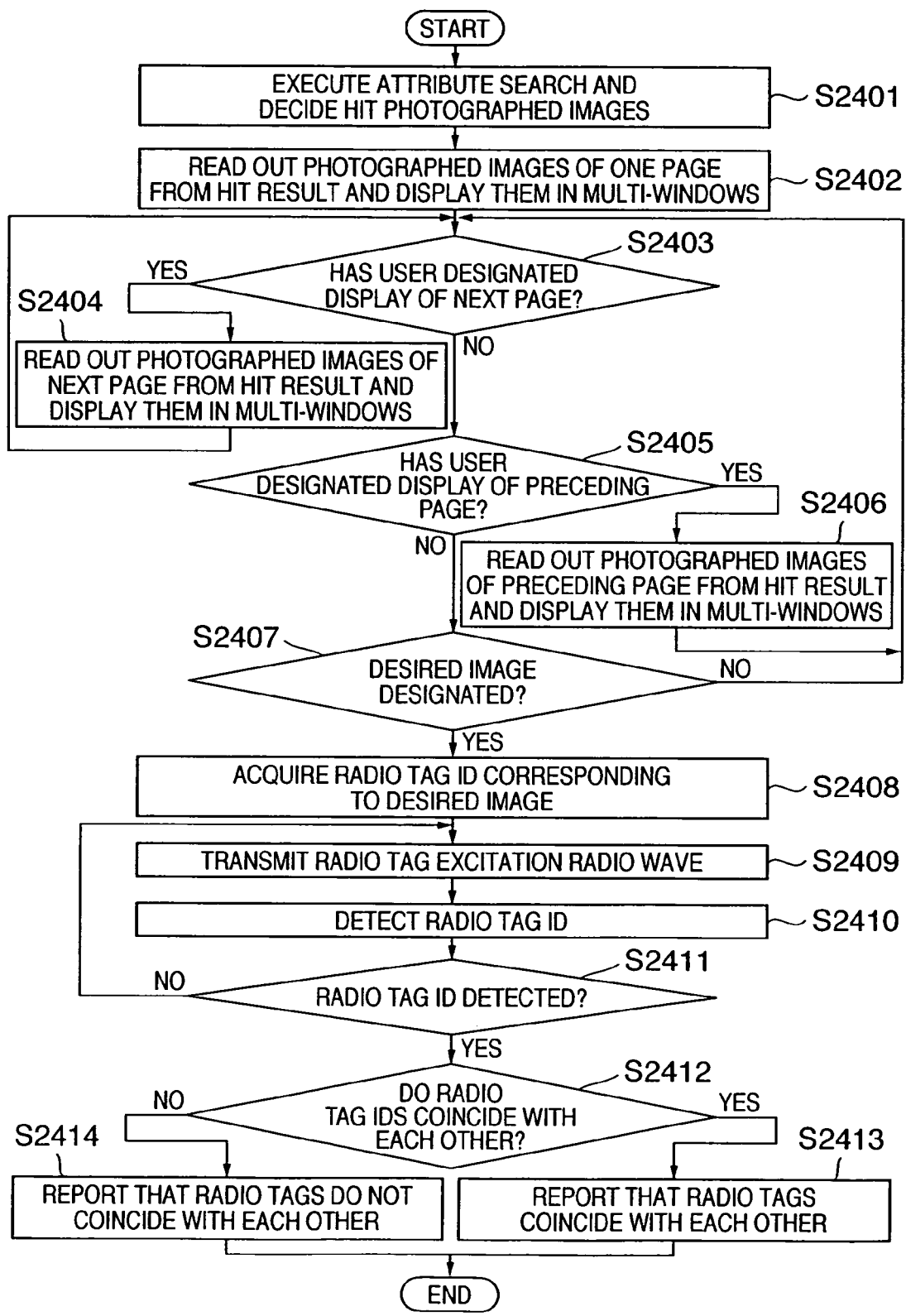
FIG. 20 is a flow chart showing determination processing executed by a photographing apparatus 101 according to the ninth embodiment.

Determination processing executed by a photographing apparatus 101 will be described with reference to the flow chart shown in FIG. 20. First, the user designates a desired category in the category list by using, e.g., a menu 605. In this example, "small article" is designated. When the user designates the category (attribute), attribute search is executed (step S2401). Hit images (in the example shown in FIG. 17, "red glasses", "silver-rimmed spectacles", and "sunglasses") are read out, and their thumbnail images are displayed in multi-windows 601 (step S2402).

If the desired image is not present in the multi-windows 601, the user scrolls the window up or down by using a cross-shaped cursor key 602. When the user designates to display the next page (step S2403) or display the preceding page (step S2405), photographed images of one page, which are not displayed yet, are read out from all the images registered in a database DB, and their thumbnail images are displayed in the multi-windows 601 (step S2404 or S2406).

The user displays candidate images. When the desired image "red glasses" is present, the OK button at the center of the cross-shaped cursor key 602 is pressed to decide the desired image. In this way, the user designates the desired image (step S2407). The processing in steps S2403, S2405, and S2407 represents an event-driven flow for the illustrative convenience. If the user inputs nothing, the flow continuously loops through steps S2403→S2405→S2407→S2403.

When the thumbnail image of the desired "red glasses" is designated by the user in step S2407, the flow advances to step S2408 to acquire radio tag information paired with the image.

In step S2409, a radio tag detector 105 sends a radio wave that excites the radio tag. By the electromotive force, the radio tag transmits radio tag information.

In steps S2410 and S2411, radio tag information detection processing is executed, and it is determined whether radio tag information is detected. If NO in step S2411, the flow returns to step S2409 to send the radio wave that excites the radio tag. This processing is recursively repeated. At this time, to avoid interference of radio tag signals, the object whose radio tag information should be detected is preferably separated from other objects.

If YES in step S2411, the flow advances to step S2412 to compare the radio tag information of the "red glasses" with the radio tag information (the value of the tag ID) detected this time. If the two pieces of radio tag information coincide with each other, a message "match!" is displayed in a status display area 603 in step S2413, as shown in FIG. 17. If the two pieces of radio tag information do not coincide with each other, it is reported in step S2414 that they do not coincide with each other.

Instead of displaying the status, a green LED may be turned on for coincidence, and a red LED may be turned on for incoincidence. Alternatively, a voice message "determined as match" or "do not match" may be output.

As described above, when a user's article is mixed with a plurality of articles with alike outer appearances, the tag ID of the radio tag attached to the object is acquired by using the radio tag detector. A tag ID paired with the photographed image is compared with the tag ID of the radio tag attached to the object, thereby distinguishing the article of user's own. In addition, when the category is designated in advance, the desired image can efficiently be searched for.

10th Embodiment

Determination processing of the ninth embodiment is modified. Registration processing is the same as in the eighth embodiment, and a detailed description thereof will be omitted.

<Determination Processing>

Figure 21:
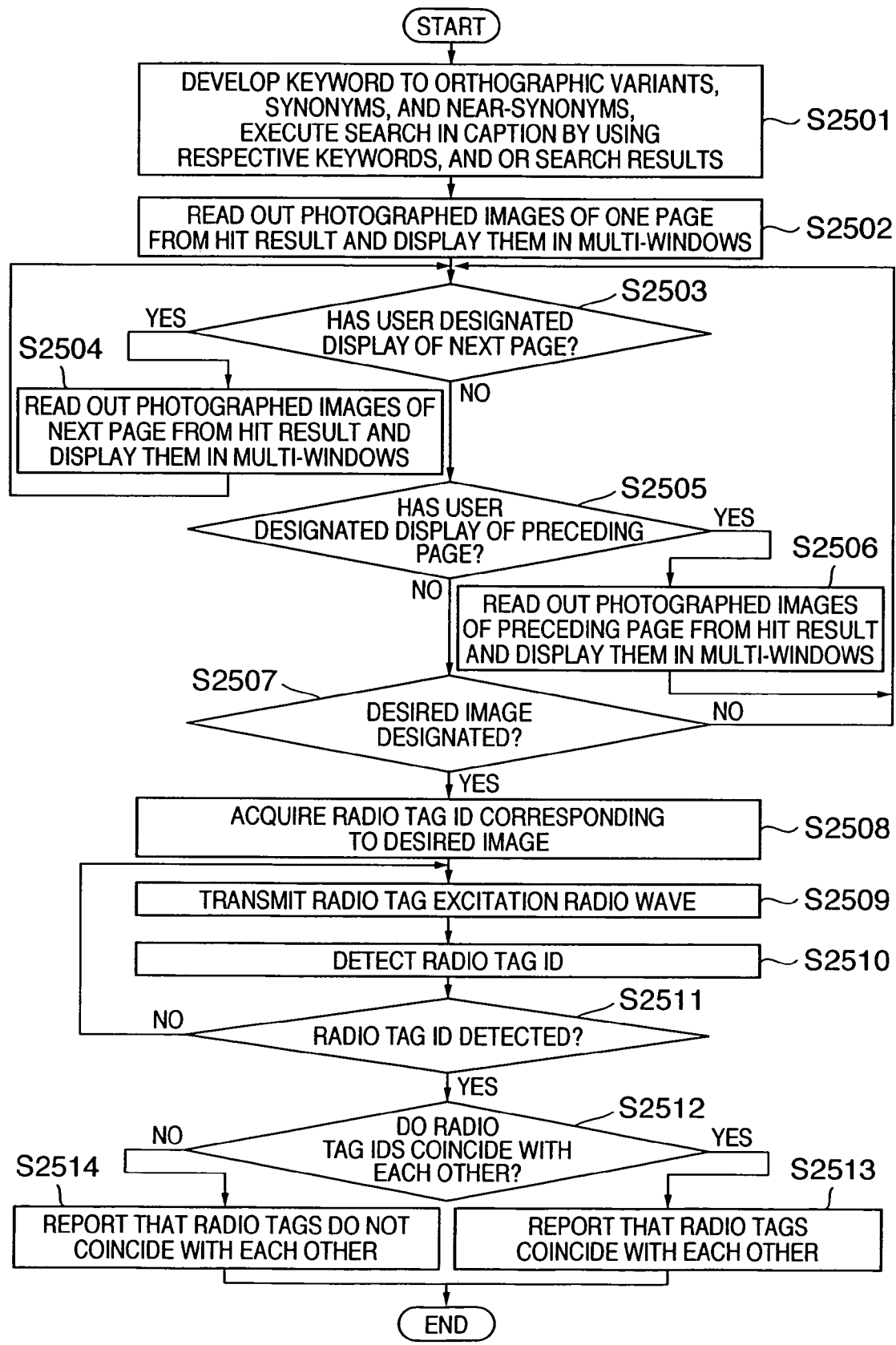
FIG. 21 is a flow chart showing determination processing executed by a photographing apparatus 101 according to the 10th embodiment.

Determination processing executed by a photographing apparatus 101 will be described with reference to the flow chart shown in FIG. 21. First, the user inputs a keyword related to the desired article. In this case, as shown in FIG. 17, for example, a keyword field 606 is selected, and a free keyword containing characters in limited number or less is input by using character input keys 604.

When the user inputs the keyword, keyword search is executed (step S2501). Hit images are read out, and their thumbnail images are displayed in multi-windows 601 (step S2502).

In the keyword search, the input keyword is developed to orthographic variants, synonyms, and near-synonyms by using an orthographic variant dictionary, synonym dictionary, and near-synonym dictionary. The search results of photographed image sets corresponding to captions containing these words are ORed, thereby preventing any drop-out due to word fluctuations. The captions containing the developed words can be obtained by execute known grep processing and wildcard matching of characters.

For example, assume that the development to orthographic variants, synonyms, and near-synonyms is not executed. When a keyword "spectacles" is selected, "red glasses" that should be determined does not hit, although "silver-rimmed spectacles" hits. In this example, when "spectacles" is developed to "spectacles" and "glasses" by development to orthographic variants, "glasses" of "red glasses" hits, and its image is contained in the list in the multi-windows.

If the desired image is not present in the multi-windows 601, the user scrolls the window up or down by using a cross-shaped cursor key 602. When the user designates to display the next page (step S2503) or display the preceding page (step S2505), photographed images of one page, which are not displayed yet, are read out from all the images registered in a database DB, and their thumbnail images are displayed in the multi-windows 601 (step S2504 or S2506).

The user displays candidate images. When the desired image "red glasses" is present, the OK button at the center of the cross-shaped cursor key 602 is pressed to decide the desired image. In this way, the user designates the desired image (step S2507). The processing in steps S2503, S2505, and S2507 represents an event-driven flow for the illustrative convenience. If the user inputs nothing, the flow continuously loops through steps S2503→S2505→S2507→S2503.

When the thumbnail image of the desired "red glasses" is designated by the user in step S2507, the flow advances to step S2508 to acquire radio tag information paired with the image.

In step S2509, a radio tag detector 105 sends a radio wave that excites the radio tag. By the electromotive force, the radio tag transmits radio tag information.

In steps S2510 and S2511, radio tag information detection processing is executed, and it is determined whether radio tag information is detected. If NO in step S2511, the flow returns to step S2509 to send the radio wave that excites the radio tag. This processing is recursively repeated. At this time, to avoid interference of radio tag signals, the object whose radio tag information should be detected is preferably separated from other objects.

If YES in step S2511, the flow advances to step S2512 to compare the radio tag information of the "red glasses" with the radio tag information (the value of the tag ID) detected this time. If the two pieces of radio tag information coincide with each other, a message "match!" is displayed in a status display area 603 in step S2513, as shown in FIG. 17. If the two pieces of radio tag information do not coincide with each other, it is reported in step S2514 that they do not coincide with each other.

Instead of displaying the status, a green LED may be turned on for coincidence, and a red LED may be turned on for incoincidence. Alternatively, a voice message "determined as match" or "do not match" may be output.

As described above, when a user's article is mixed with a plurality of articles with alike outer appearances, the tag ID of the radio tag attached to the object is acquired by using the radio tag detector. A tag ID paired with the photographed image is compared with the tag ID of the radio tag attached to the object, thereby distinguishing the article of user's own. In addition, when the keyword is input in advance, the desired image can efficiently be searched for.

When glasses have no radio tag, the apparatus does not react, although a description thereof has been omitted in the above embodiments. When the apparatus exhibits no reaction, it should be regarded as "incoincidence".

As search condition setting in the ninth and 10th embodiments, menu selection by using the cross-shaped cursor key 602 and character input using the character input keys 604 have been described. However, a UI by voice recognition may be used. For example, in the ninth embodiment, a category is uttered by words, and voice recognition is executed. In the 10th embodiment, a keyword may be input by using voice recognition.

When an article with a radio tag is in a bag, an image icon is designated on the display screen of the apparatus, and a radio tag ID corresponding to the image icon is obtained and compared with a radio tag ID obtained by the radio tag detector. With this operation, whether the article designated by the image icon is present in the bag can be known.

In the above embodiments, a radio tag which ensures an operation power supply by an induced electromotive force by a radio wave has been described. There is also a radio tag that has an internal power supply and transmits radio tag information. In this case, an instruction is given to the radio tag by touching it to execute communication within a predetermined time, a predetermined number of times of communications, or a predetermined number of times of communications within a predetermined time, thereby causing the radio tag to transmit radio tag information. When such a radio tag is used, processing for powering on the radio tag by touching it is added in place of the processing in step S2204 shown in FIG. 16.

As described above, the photographing apparatus 101 has the radio tag detector 105 so that both photographing and radio tag detection can simultaneously efficiently be executed. The subject can be photographed almost simultaneously as the apparatus 101 is moved close to the subject to detect the tag ID so that the tag ID and image information can be paired and managed. In addition, the radio tag is detected immediately before photographing. Hence, any photographing error, in which, e.g., only the subject is photographed without acquiring the radio tag information, can be prevented.

Although a radio tag ID is made of a symbol string that is insignificant for persons and hardly remains in their memory, an image readily remains in memory. Hence, an image can be used as a symbol, i.e., an icon that represents the radio tag ID. As described in the above embodiments, a pair of a radio tag ID and a photographed image as an image icon can easily be obtained. When the photographed image is used as the icon of the radio tag ID, and the image icon is selected, the desired radio tag ID can be decided. When a user's article is mixed with a plurality of articles with alike outer appearances, the radio tag ID of the radio tag attached to the object is acquired by using the radio tag detector incorporated in the apparatus. A radio tag ID paired with the photographed image is compared with the radio tag ID of the radio tag attached to the object, thereby distinguishing the article of user's own.

As described above, according to the eighth to 10th embodiments, subject management can be executed by effectively using a pair of radio information and image information.

11th Embodiment

In the 11th embodiment, article management will be described, in which the radio tag of an article in a container such as a vessel whose contents are invisible is detected, and the image of the article is displayed. Since the article inside can be known without opening the vessel, for example, a thing can be prevented from being left behind.

A detailed example will be described, in which radio tags are used to prevent articles such as a camera, padlock, and glasses, which should be put in a bag for going out, from being left behind. Radio tags are attached to the articles such as a camera, padlock, and glasses in advance. Radio tag IDs acquired from the radio tags and images obtained by photographing the camera, padlock, and glasses are paired and registered (registration processing). The radio tag IDs are detected at the place where the user has gone, and the corresponding images are displayed, thereby confirming that the camera, padlock, and glasses are present in the bag (detection processing).

The article management according to the 11th embodiment comprises registration processing and detection processing, as described above. The registration processing and detection processing will be described below in detail.

<Registration Processing>

Figure 22A:
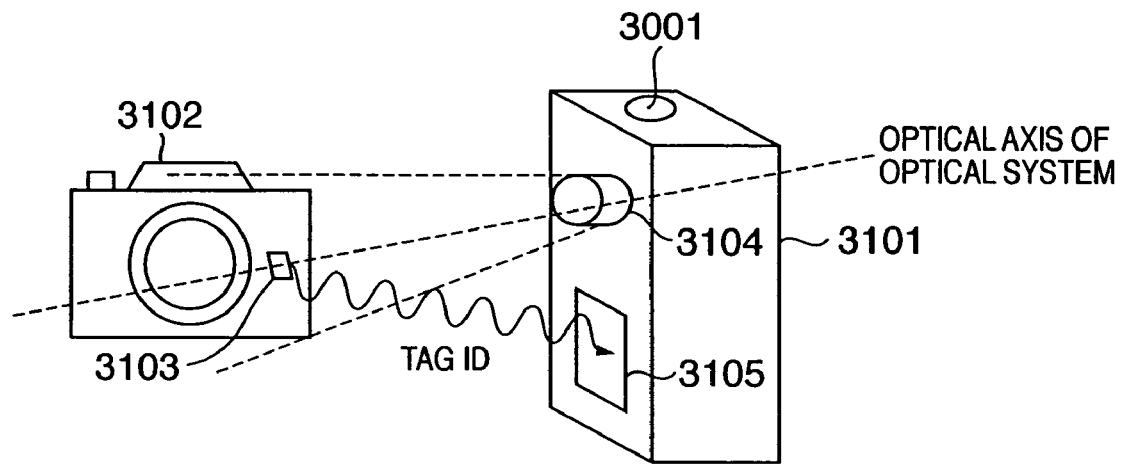
FIGS. 22A and 22B are views showing the configuration of an entire system including an article management apparatus 3101 according to the 11th embodiment.

FIG. 22A shows the configuration of an entire system including an article management apparatus 3101 according to this embodiment. The article management apparatus 3101 is a portable apparatus having a photographing function. The article management apparatus 3101 is constituted by, e.g., a digital camera, a cellular phone terminal with a camera, or a video camera. Reference numeral 3102 denotes an article (a camera in FIG. 22A); and 3103, a radio tag serving as an information transmission means which is attached to the article 3102 to store predetermined information and transmit the predetermined information as radio information.

In the article management apparatus 3101, a lens 3104 serves as a photographing optical system to photograph the article 3102. A radio tag detector 3105 serves as an information acquisition means (radio tag detection device) to acquire radio tag information (radio tag ID). Although not illustrated in FIG. 22A, the article management apparatus 3101 has a display section such as a liquid crystal display. In this embodiment, the photographing apparatus separately has the photographing unit and the information acquisition means. However, the photographing unit and information acquisition means may be integrated.

Radio tag information is unique ID information that can specify, e.g., an article or site. A device has recently been announced as an example of a radio tag. This device stores number information unique to an individual by using a very small silicon chip called a μ-chip. Upon receiving an external radio wave, the device obtains power by an induced electromotive force and becomes able to receive the number information unique to an individual by radio. However, the radio tag is not particularly limited as long as it can implement a function of this type.

When a radio tag information registration photographing mode should be enabled, the radio tag 3103 is attached to the article 3102 in advance before photographing. Various methods can be used to attach a radio tag. For example, a radio tag may be embedded, bonded by using an adhesive seal, or mixed in a paint and applied to a position where transmission of a radio wave is not impeded. Alternatively, the radio tag 3103 may be incorporated in the article 3102, attached or added to part of the article 3102, or mounted on the article 3102. However, the present invention is not particularly limited to the above-described attachment methods.

To execute both photographing of the article 3102 and acquisition of radio tag information by a series of operations, the article management apparatus 3101 preferably keeps the same posture for photographing and tag information reception. For this purpose, the radio tag detector 3105 is arranged at a position (in this embodiment, at a position on a surface of the apparatus near the lens 3104 and on the same surface side as that of the lens 3104) where a radio wave from the radio tag 3103 can keep sufficient sensitivity and/or directivity while making the lens 3104 face the article 3102. If the direction of directivity is the same or almost the same as the photographing direction of the lens 3104, and a sufficient sensitivity can be maintained, the radio tag detector 3105 may be present on the rear surface of the article management apparatus 3101.

Figure 22B:
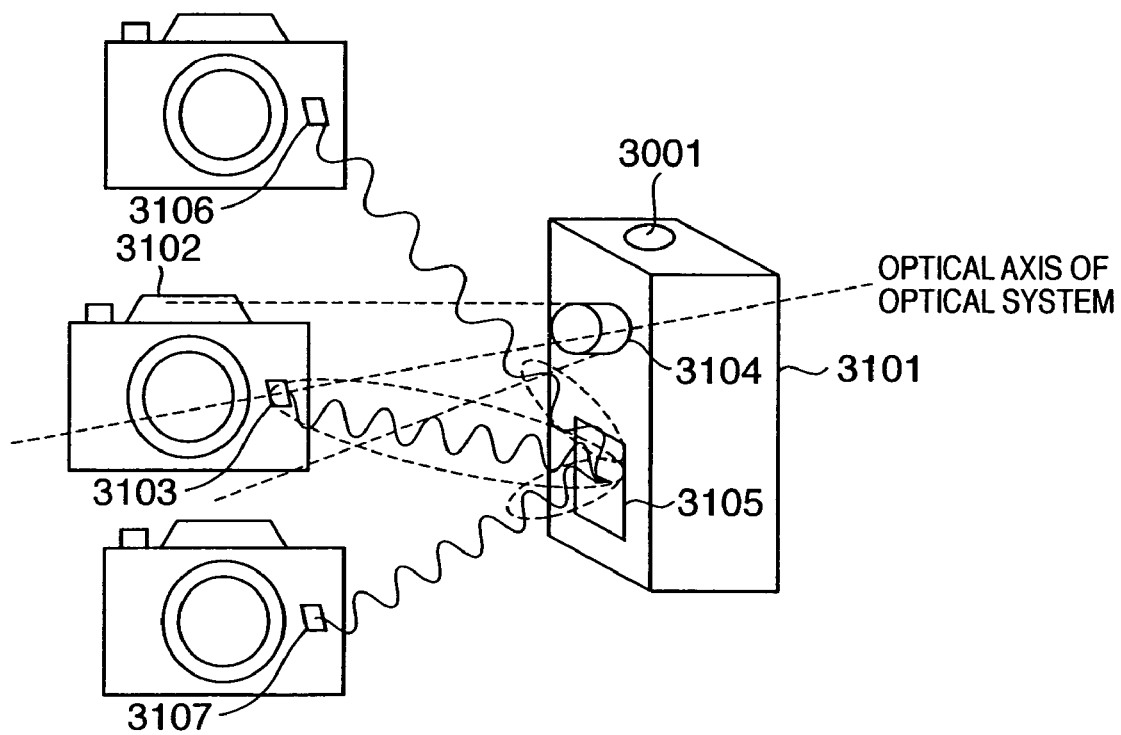

As shown in FIG. 22B, when a plurality of radio tags 3103, 3106, and 3107 are present, simultaneous reception from radio tags except the target must be avoided. To do this, preferably, the detection section of the radio tag detector 3105 has a directivity of a predetermined angle, and the photographing direction of the lens 3104 is the same or almost the same as the direction of directivity.

Macro-photographing normally used to photograph a small article is executed at a distance of about 20 to 40 cm. The axis of directivity of the radio tag detector 3105 may cross the optical axis of the optical system at a position separated from the lens by about 20 to 40 cm.

In the example shown in FIG. 22B, the size of each elliptic (dotted ling in FIG. 22B) from the radio tag detector 3105 as a target indicates the directional sensitivity. When the radio tag 3103 is present on the optical axis of the optical system and at the intersection between the optical axis and the direction of maximum directivity of the radio tag, the sensitivity to the radio waves from the radio tags 3106 and 3107 as non-targets is small. Hence, the influence of the radio tags 3106 and 3107 is small.

The arrangement of the article management apparatus 3101 according to the 11th embodiment is the same as that shown in FIG. 2, and a detailed description thereof will be omitted.

Figure 23:
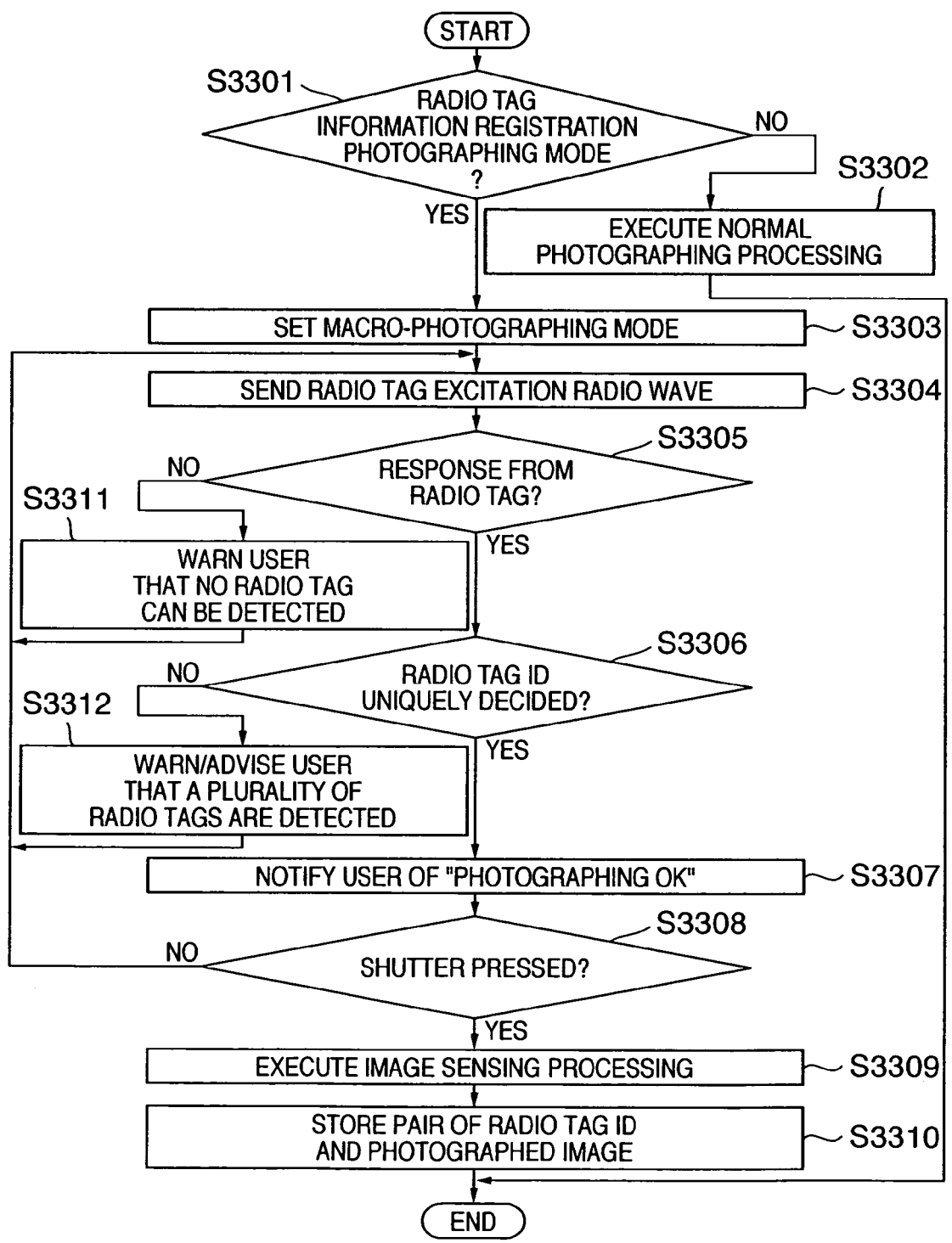
FIG. 23 is a flow chart for explaining an example of registration processing according to the 11th embodiment.

An example of registration processing executed by the article management apparatus 3101 will be described below with reference to the flow chart shown in FIG. 23. In step S3301, it is determined whether the mode selected by the user is a normal photographing mode or radio tag information registration photographing mode. To select a mode, the photographing mode may be set first, and then in that state, the mode may be switched by using another switch different from the photographing mode switch. Alternatively, the normal photographing mode and radio tag information registration photographing mode may be prepared as choices on a rotary photographing mode selection switch that is used to select an automatic or manual photographing mode in a normal camera.

When the normal photographing mode is selected in step S3301, photographing processing is executed in step S3302 without executing any processing related to the radio tag. Image data and automatically obtained metadata such as a date are stored. That is, the function of the radio tag detector is not concerned with the normal photographing mode. The processing is the same as normal photographing, and a detailed description thereof will be omitted.

On the other hand, when the radio tag information registration photographing mode is selected in step S3301, the flow advances to step S3303 to automatically switch the image sensing system to the macro-photographing mode. The article having a radio tag is considered to be near the article management apparatus 3101. Hence, when the photographing mode is automatically switched to, e.g., the macro-photographing mode or short-range photographing mode (a mode in which the focal length is set to a short range corresponding to the detectable distance of the radio tag detector), the load on the user can be reduced.

In step S3304, the radio tag detector 3105 generates a radio wave that excites the radio tag. By the electromotive force, the radio tag transmits radio tag information.

In step S3305, it is determined whether a response from the radio tag is received. If YES in step S3305, the flow advances to step S3306. When only one radio tag information is detected, or when a plurality of pieces of radio tag information are detected, and a radio tag ID signal with the highest signal strength is stronger than a radio tag ID signal having the second highest signal strength by a predetermined difference or scaling factor or more so that the radio tag ID with the highest signal strength can be specified, it is determined that the radio tag ID can uniquely be decided, and the communication for radio tag search has been done successfully. Even when a plurality of tags are detected, it may also be determined that the communication has been done successfully if the tags belong to a specific group determined in advance.

When it is determined in step S3306 that the communication for radio tag search has been done successfully, the flow advances to step S3307 to show the status "photographing OK" by, e.g., turning on a green lamp in the viewfinder or on the main body, displaying the status on the liquid crystal display section, or outputting a warning message of voice.

When it is detected in step S3308 that the photographing button (shutter button) is pressed, image sensing processing is executed in step S3309. In step S3310, the radio tag information and the obtained image information are set in an information format, in which they are paired, and stored. If the photographing button (shutter button) is not immediately pressed in step S3308, the situation may have changed. The flow returns to step S3304 to execute again the radio tag information transmission search processing.

As an information schema that stores pairs of information, for example, a database DB shown in FIG. 24 is used. A DB record stores a radio tag ID 3401, photographed image data 3402, and metadata 3403 such as a date that can automatically be acquired. The schema may store the address of the image storage destination or the path information of the image file as a pointer to the image in place of the photographed image data itself.

As described above, the user can grasp the radio tag information detection state and execute processing depending on whether the radio tag detection has successfully be done.

When it is determined in step S3305 that the acquisition of radio tag information has failed, the flow advances to step S3311 to warn the user by screen display, sound, or light. An example of the warning contents is that no radio tag information can be detected or there are a plurality of radio tag information sources. As a user-friendly method, when no radio tag information is detected, the user is warned by screen display, sound, or light to change the conditions for radio tag detection and execute photographing again.

If, in step S3306, a plurality of tags are detected, and one of them cannot uniquely be specified although the communication for radio tag search has successfully be done, the flow advances to step S3312 to advise the user to move the subject to a position where other radio tags have less influence or increase the radio tag reception signal by moving the article management apparatus 3101 close to the subject, thereby leading the user to appropriate photographing. In this way, processing for performing image sensing processing when the communication has successfully been done in the half-pressed state or advising processing when the communication has failed may recursively be done.

The release of the photographing button may be inhibited without warning the user in step S3311 or S3312, though it is not user-friendly.

As described above, both photographing of an article and acquisition of radio tag information attached to the article can be executed by a series of simple operations. This processing is executed for the target articles (in this example, the camera, padlock, and glasses). The three pieces of radio tag information and photographed image data are paired and registered in the database.

<Detection Processing>

Figure 25:
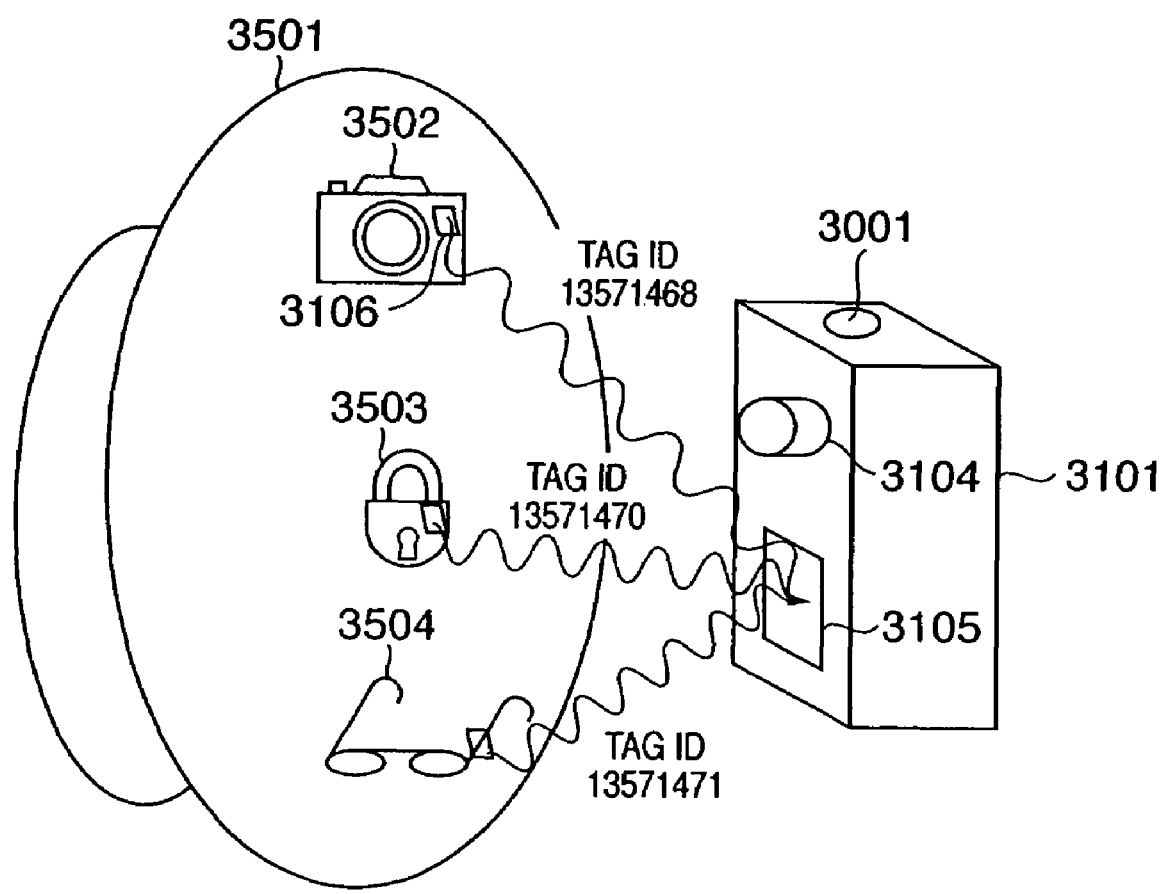
FIG. 25 is a view showing a situation in detection processing.

FIG. 25 shows a situation in detection processing. As shown in FIG. 25, a camera 3502, padlock 3503, and glasses 3504 which have undergone the above-described registration processing are in a bag 3501 whose contents are invisible.

Figure 26:
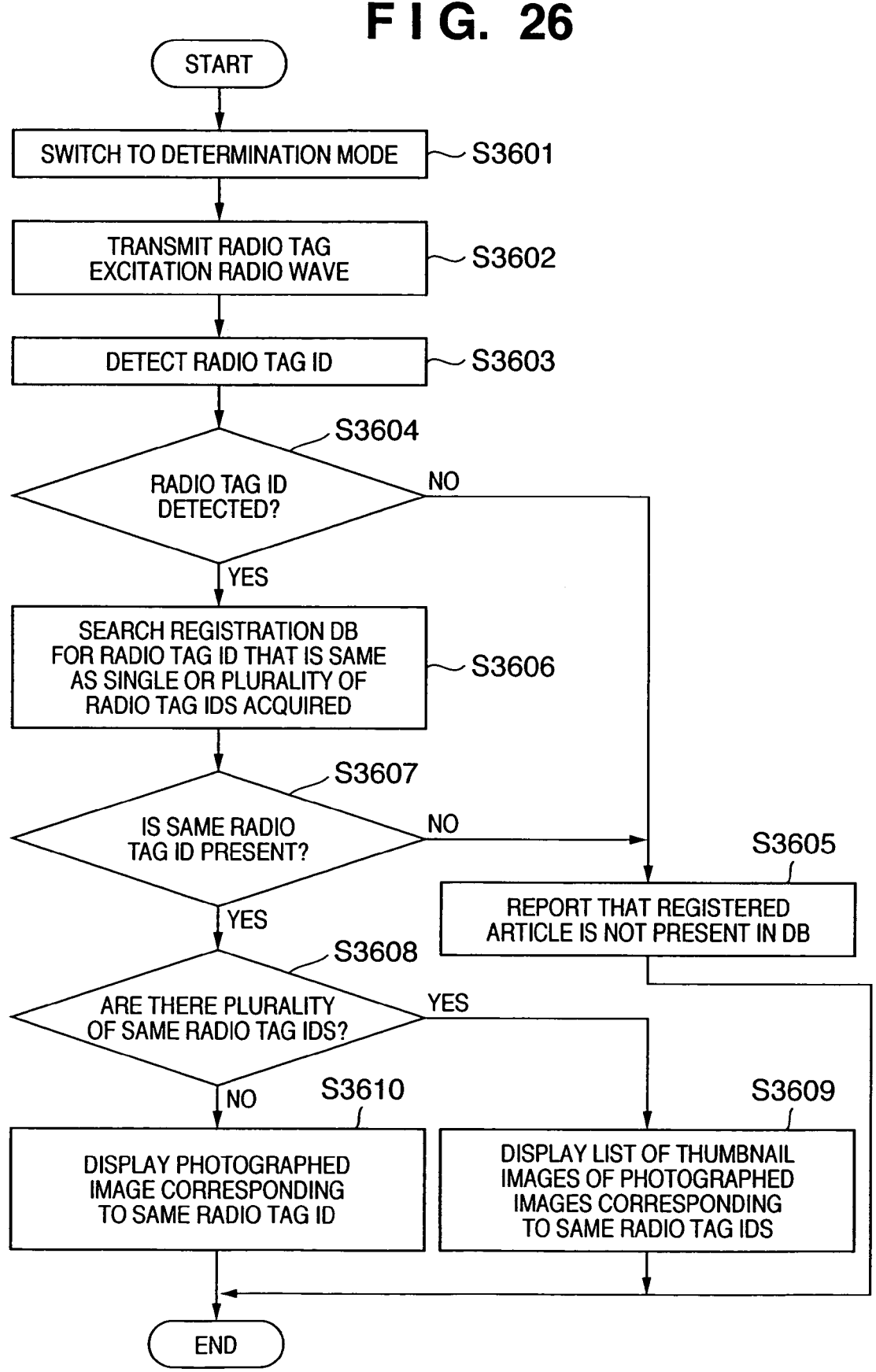
FIG. 26 is a flow chart for explaining an example of detection processing according to the 11th embodiment.

An example of detection processing executed by the article management apparatus 3101 will be described below with reference to the flow chart shown in FIG. 26. When the article management apparatus 3101 is switched to a search mode (step S3601), it transmits a radio wave that excites a radio tag in step S3602. The determiner (user) moves the radio tag detector 3105 of the article management apparatus 3101 close to the bag 3501.

In the registration processing, when radio tag information having the highest signal strength can be decided, processing for uniquely deciding the radio tag information is executed (when a plurality of pieces of radio tag information are detected, and a radio tag ID signal with the highest signal strength is stronger than a radio tag ID signal having the second highest signal strength by a predetermined difference or scaling factor or more). In the detection processing, a plurality of pieces of radio tag information can be detected.

In the detection processing, conditions on the device side may be changed by, e.g., relaxing the directivity.

In step S3603, radio tag ID detection processing is executed for a predetermined time. If no radio tag ID is detected (NO in step S3604), the flow advances to step S3605 to notify the user, by screen display, sound, or light, that the articles registered in the DB are not present.

When a radio tag ID is detected (YES in step S3604), the flow advances to step S3606 to compare it with radio tag IDs stored in the DB by the registration processing. If it is determined in step S3607 that the same radio tag ID is not present, the flow advances to step S3605 to notify the user, by screen display, sound, or light, that the articles registered in the DB are not present.

If it is determined in step S3607 that the same radio tag ID is present, the flow advances to step S3608 to determine whether there are a plurality of same radio tag IDs.

If YES in step S3608, photographed images corresponding to the same radio tag IDs are sequentially read out, and their thumbnail images are displayed in multi-windows by dividing the window on a display section 3009 in step S3609. When the number of same radio tag IDs is large, the number of multi-windows is increased. Alternatively, the images are displayed on the next page.

Figure 27A:
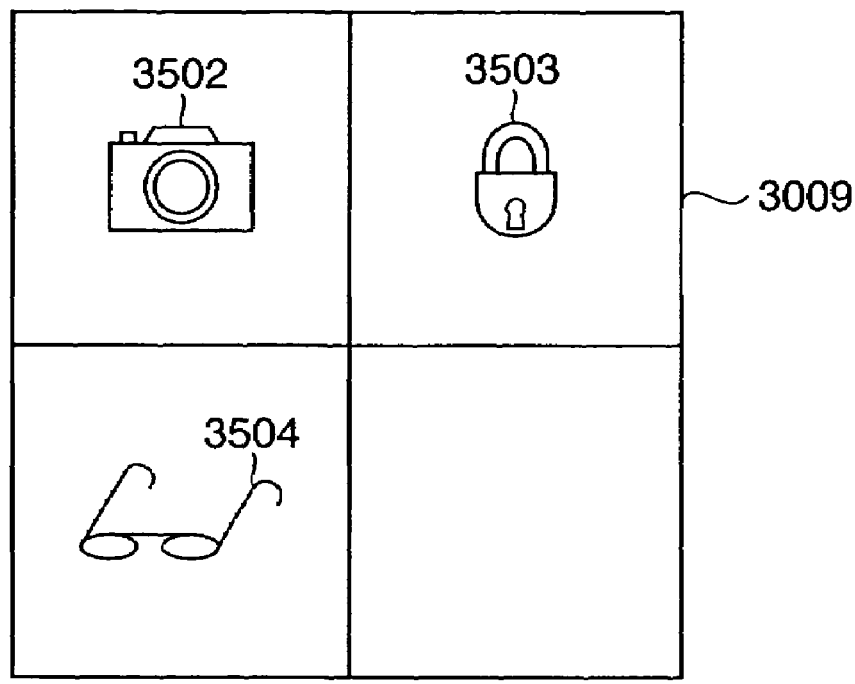
FIGS. 27A and 27B are views showing display examples.

In this example, three radio tag IDs of the camera 3502, padlock 3503, and glasses 3504 are detected. All the three radio tag IDs are present in the DB. Hence, as shown in FIG. 27A, three photographed images (the images of the camera 3502, padlock 3503, and glasses 3504) are displayed in the multi-windows. When the user sees them, he/she can instantaneously know that the camera 3502, padlock 3503, and glasses 3504 are present in the bag 3501 without opening it and can be aware of anything left.

Instead of dividing the window to display the thumbnail images, window display may sequentially be switched at an appropriate interval.

Figure 27B:
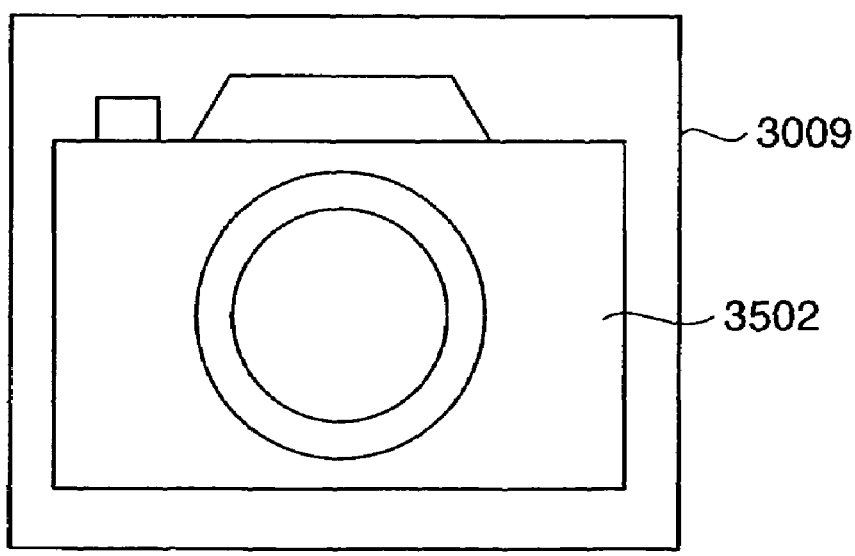

If it is determined in step S3608 that there is only one radio tag ID, a photographed image corresponding to the same radio tag ID is read out and displayed on the display section 3009 in step S3610. If only the camera 3502 is present in the bag 3501, only the photographed image of the camera 3502 is displayed, as shown in FIG. 27B.

12th Embodiment

In the 12th embodiment, article management will be described, in which the radio tag of an article to be distributed is detected, and the image of the article or the image of a portion having a characteristic feature usable for authenticity determination is displayed so that a changed radio tag or a potential forgery can be detected.

As a detailed example, a bag maker attaches radio tags to products (bags) in advance in shipping them. Radio tag IDs acquired from the radio tags and images obtained by photographing the bags are paired and registered (registration processing). On the shop side, radio tag IDs are detected, and corresponding images are displayed, thereby confirming whether any radio tag has been changed, or any bag has been replaced with a forgery during distribution (detection processing).

The article management according to the 12th embodiment comprises registration processing and detection processing, as described above. The registration processing and detection processing will be described below in detail.

<Registration Processing>

Figure 28A:
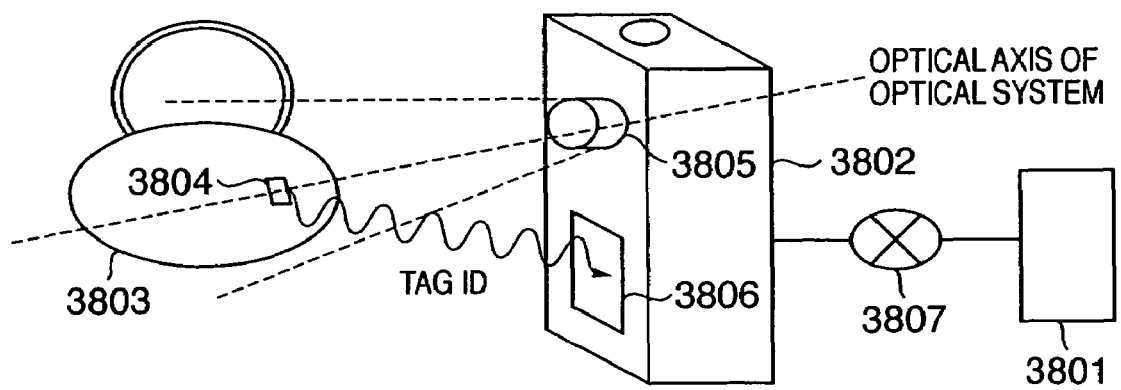
FIGS. 28A and 28B are views showing the configuration of an entire system including an article management apparatus 3801 according to the 12th embodiment.

FIG. 28A shows the configuration of an entire system including an article management apparatus 3801 according to this embodiment. Reference numeral 3802 denotes a photographing apparatus. The photographing apparatus 3802 is present on the bag maker side and is connected to the article management apparatus 3801 that exists on the shop side through a network 3807 such as the Internet. Reference numeral 3803 denotes an article (a bag in FIG. 28A); and 3804, a radio tag serving as an information transmission means which is attached to the article 3803 to store predetermined information and transmit the predetermined information as radio information.

In the photographing apparatus 3802, a lens 3805 serves as a photographing optical system to photograph the article 3803. A radio tag detector 3806 serves as an information acquisition means (radio tag detection device) to acquire radio tag information (radio tag ID). In this embodiment, the photographing apparatus separately has the photographing unit and the information acquisition means. However, the photographing unit and information acquisition means may be integrated.

Radio tag information is unique ID information that can specify, e.g., an article or site. A device has recently been announced as an example of a radio tag. This device stores number information unique to an individual by using a very small silicon chip called a μ-chip. Upon receiving an external radio wave, the device obtains power by an induced electromotive force and becomes able to receive the number information unique to an individual by radio. However, the radio tag is not particularly limited as long as it can implement a function of this type. Assume that large quantities of radio tags with radio tag IDs that are unique for certain products are available for the bag maker.

When a radio tag information registration photographing mode should be enabled, the radio tag 3804 is attached to the article 3803 in advance before photographing. Various methods can be used to attach a radio tag. For example, a radio tag may be embedded, bonded by using an adhesive seal, or mixed in a paint and applied to a position where transmission of a radio wave is not impeded. Alternatively, the radio tag 3804 may be incorporated in the article 3803, attached or added to part of the article 3803, or mounted on the article 3803. However, the present invention is not particularly limited to the above-described attachment methods.

To execute both photographing of the article 3803 and acquisition of radio tag information by a series of operations, the photographing apparatus 3802 preferably keeps the same posture for photographing and tag information reception. For this purpose, the radio tag detector 3806 is arranged at a position (in this embodiment, at a position on a surface of the apparatus near the lens 3805 and on the same surface side as that of the lens 3805) where a radio wave from the radio tag 3804 can keep sufficient sensitivity and/or directivity while making the lens 3805 face the article 3803. If the direction of directivity is the same or almost the same as the photographing direction of the lens 3805, and a sufficient sensitivity can be maintained, the radio tag detector 3806 may be present on the rear surface of the photographing apparatus 3802.

Figure 28B:
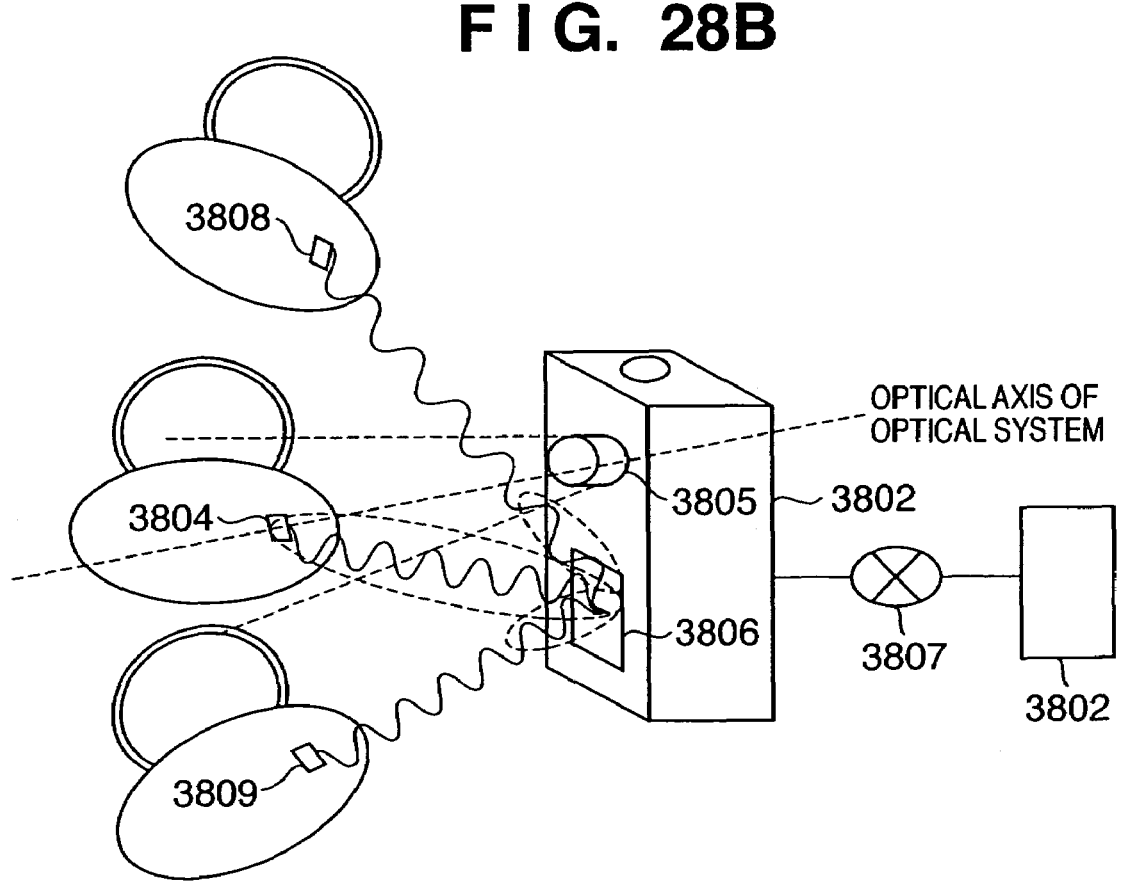

As shown in FIG. 28B, when a plurality of radio tags 3804, 3808, and 3809 are present, simultaneous reception from radio tags except the target must be avoided. To do this, preferably, the detection section of the radio tag detector 3806 has a directivity of a predetermined angle, and the photographing direction of the lens 3805 is the same or almost the same as the direction of directivity.

In this embodiment, macro-photographing is executed to photograph a feature portion (e.g., a logo plate or tag with a brand name) of the article 3803. Macro-photographing is often executed at a distance of about 20 to 40 cm. The axis of directivity of the radio tag detector 3806 may cross the optical axis of the optical system at a position separated from the lens by about 20 to 40 cm.

In the example shown in FIG. 28B, the size of each elliptic (dotted ling in FIG. 28B) from the radio tag detector 3806 as a target indicates the directional sensitivity. When the radio tag 3804 is present on the optical axis of the optical system and at the intersection between the optical axis and the direction of maximum directivity of the radio tag, the sensitivity to the radio waves from the radio tags 3808 and 3809 as non-targets is small. Hence, the influence of the radio tags 3808 and 3809 is small.

To execute both macro-photographing of the feature portion unique to the article 3803 (bag) and acquisition of the radio tag ID by a series of operations, the radio tag 3804 on the article 3803 is preferably attached near the feature portion unique to the article 3803 (bag). When both macro-photographing of the feature portion and acquisition of the radio tag ID are executed by a series of operations, simple processing can be executed while preventing any mismatch between the photographed image and the radio tag ID.

Figure 29:
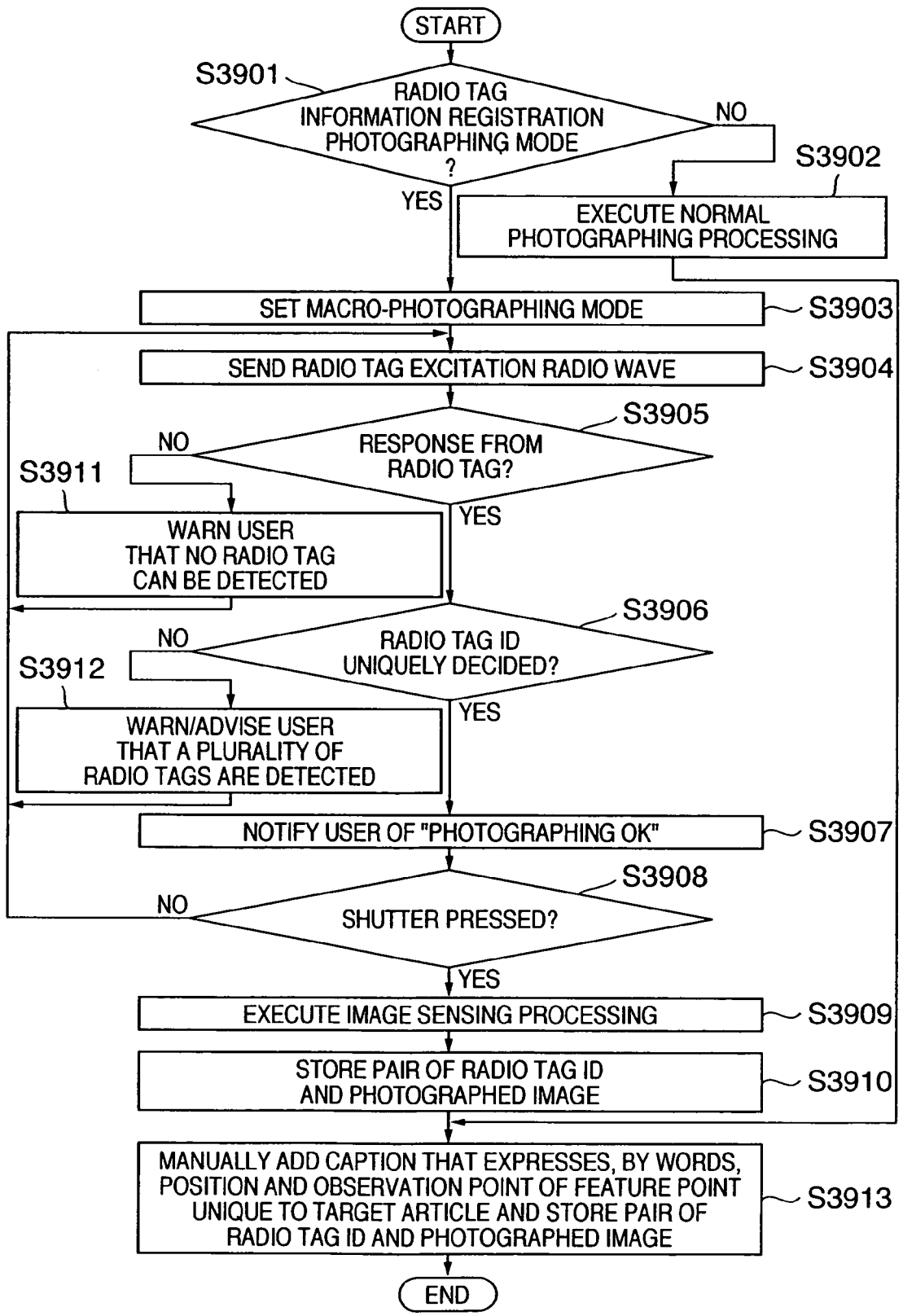
FIG. 29 is a flow chart for explaining an example of registration processing according to the 12th embodiment.

An example of registration processing executed by the photographing apparatus 3802 will be described below with reference to the flow chart shown in FIG. 29. Processing in steps S3901 to S3912 is the same as that in steps S3301 to S3312 of the flow chart shown in FIG. 23 described in the 11th embodiment, and a detailed description thereof will be omitted.

In step S3910, radio tag information and obtained image information are set in an information format, in which they are paired, and stored. After that, the flow advances to step S3913 to receive user input of a caption that explains the position and observation point of the feature portion unique to the article 3803.

Figure 30:
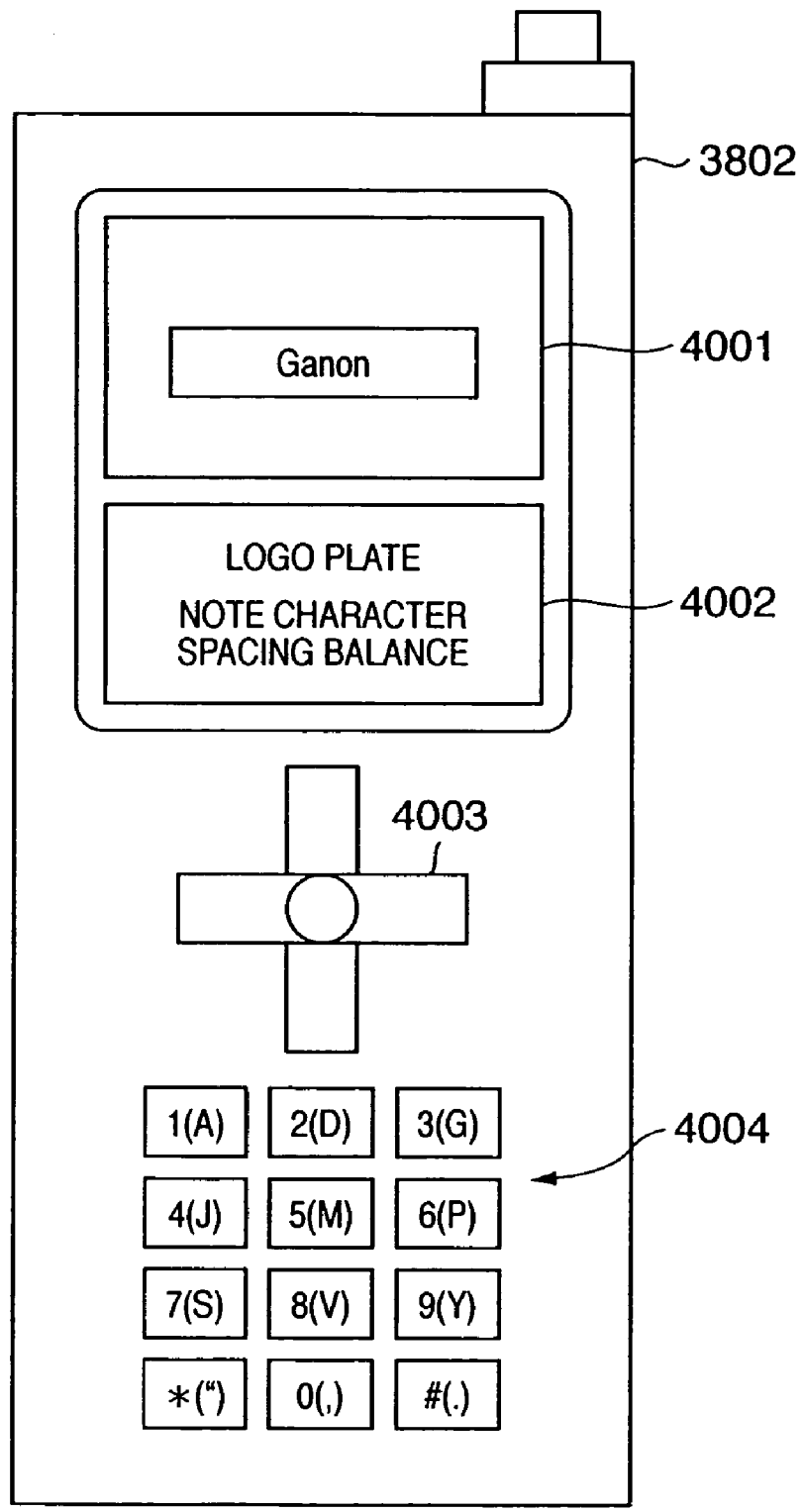
FIG. 30 is a view showing the outer appearance of an photographing apparatus 3802.

For example, as shown in FIG. 30, the photographing apparatus 3802 comprises an image display section 4001, caption display section 4002, cross-shaped cursor key 4003, and character input section 4004. The user selects the caption display section 4002 by using the cross-shaped cursor key 4003. He/she inputs the position of the feature portion (in the example shown in FIG. 30, "logo plate with brand name") of the article 3803 and its observation point ("note character spacing of brand name") as texts with characters in limited number or less by operating the character input section 4004. Instead of using the character input section 4004, voice may be converted into a character string by voice recognition.

As an information schema that stores pairs of information, for example, a database DB shown in FIG. 31 is used. A DB record stores not only radio tag ID information and a pointer to that image but also metadata such as a date and the user-input text data of the caption. The pointer to the image can be the address of the image storage destination or the path information of the image file. The schema may store the image data itself in place of the pointer to the image.

As described above, photographing of an article and acquisition of radio tag information attached to the article are executed by a series of simple operations. A caption that explains the position of and observation point of the feature portion unique to the article 3803 can be stored in correspondence with the pair of photographed image and radio tag information.

<Detection Processing>

Figure 32:
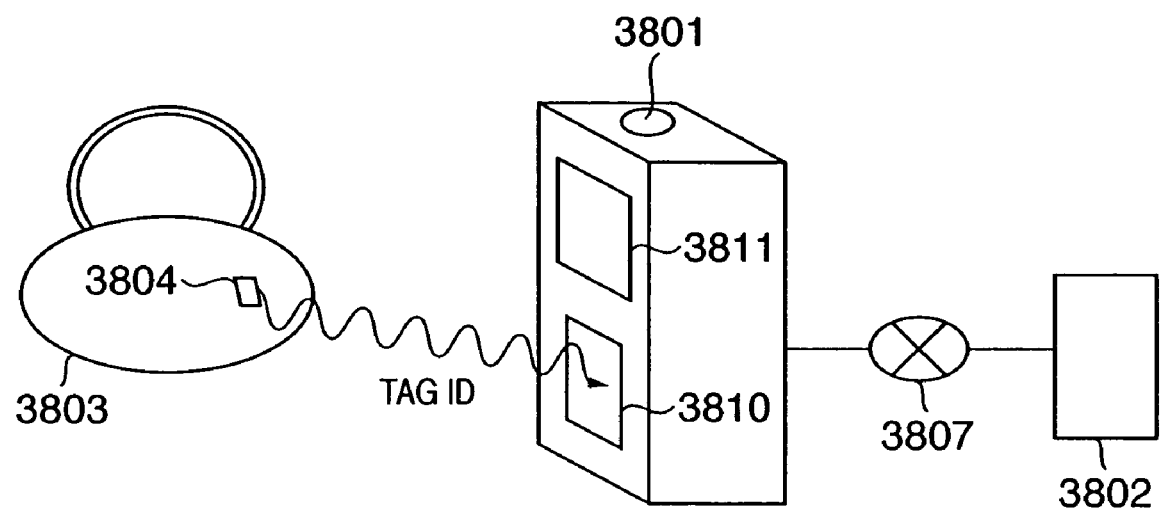
FIG. 32 is a view showing a situation in detection processing.

FIG. 32 shows a situation in detection processing. The article management apparatus 3801 is present on the side of the shop which stocks up the maker's bags. The article management apparatus 3801 is connected to the photographing apparatus 3802 through the network 3807 such as the Internet. In the article management apparatus 3801, a radio tag detector 3810 serves as an information acquisition means (radio tag detection device) to acquire radio tag information (radio tag ID). A display section 3811 is formed from a liquid crystal display that displays an image and the like. Both the photographing apparatus 3802 and the article management apparatus 3801 have the function of acquiring a radio tag ID. For this reason, the photographing apparatus 3802 and article management apparatus 3801 may be apparatuses of the same model and exist on the maker side and on the shop side, respectively.

The database record information (FIG. 31) registered by the photographing apparatus 3802 is transferred to the article management apparatus 3801 through the network 3807. In the transfer, the database record information is preferably encrypted on the transfer path.

FIGS. 28A, 28B, and 32 illustrate the photographing apparatus 3802 directly connected to the network 3807. In, e.g., the actual operation, data such as radio tag IDs, image data, and annotations acquired by the photographing apparatus 3802 may be uploaded to a web server (not shown) on the maker side and managed in the database on the web server. The data may be received from the database by accessing it through the article management apparatus 3801 on the shop side. An example in which the data are transferred through the network 3807 has been described above. Instead, the maker side may deliver, to the shop side, a recording medium in which the database record information is recorded.

Figure 33:
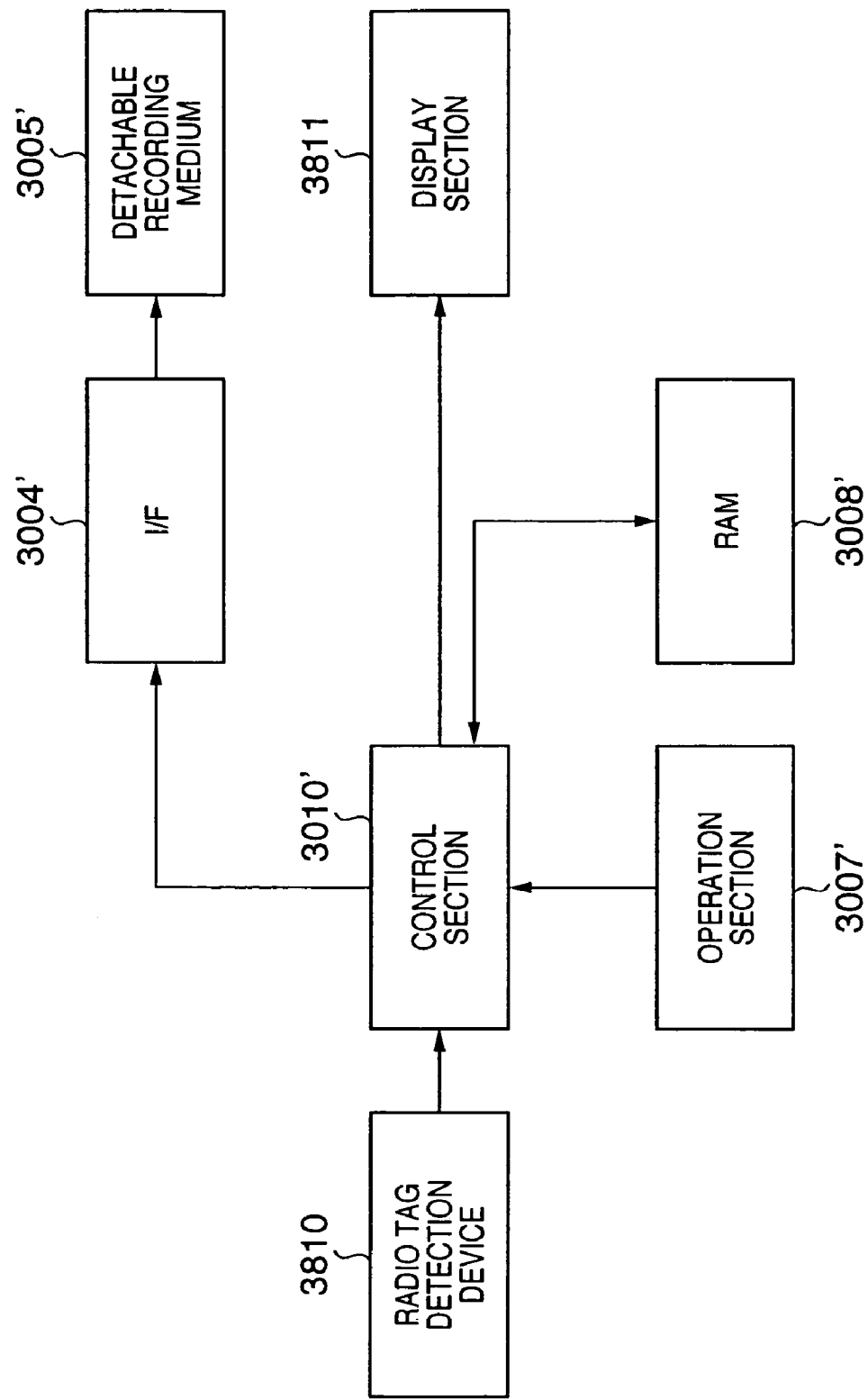
FIG. 33 is a block diagram showing an arrangement example of an article management apparatus 3801.

FIG. 33 is a block diagram showing an arrangement example of the article management apparatus 3801. An interface circuit 3004' connects a detachable recording medium 3005' such as a semiconductor memory. Reference numeral 3810 denotes the radio tag detection device; 3007', an operation section for various operations; 3008', a RAM or EEPROM to store the control program of the apparatus; 3811, the display section that displays an image or warning; and 3010', a control circuit which incorporates a CPU and controls the circuits in the apparatus.

Figure 34:
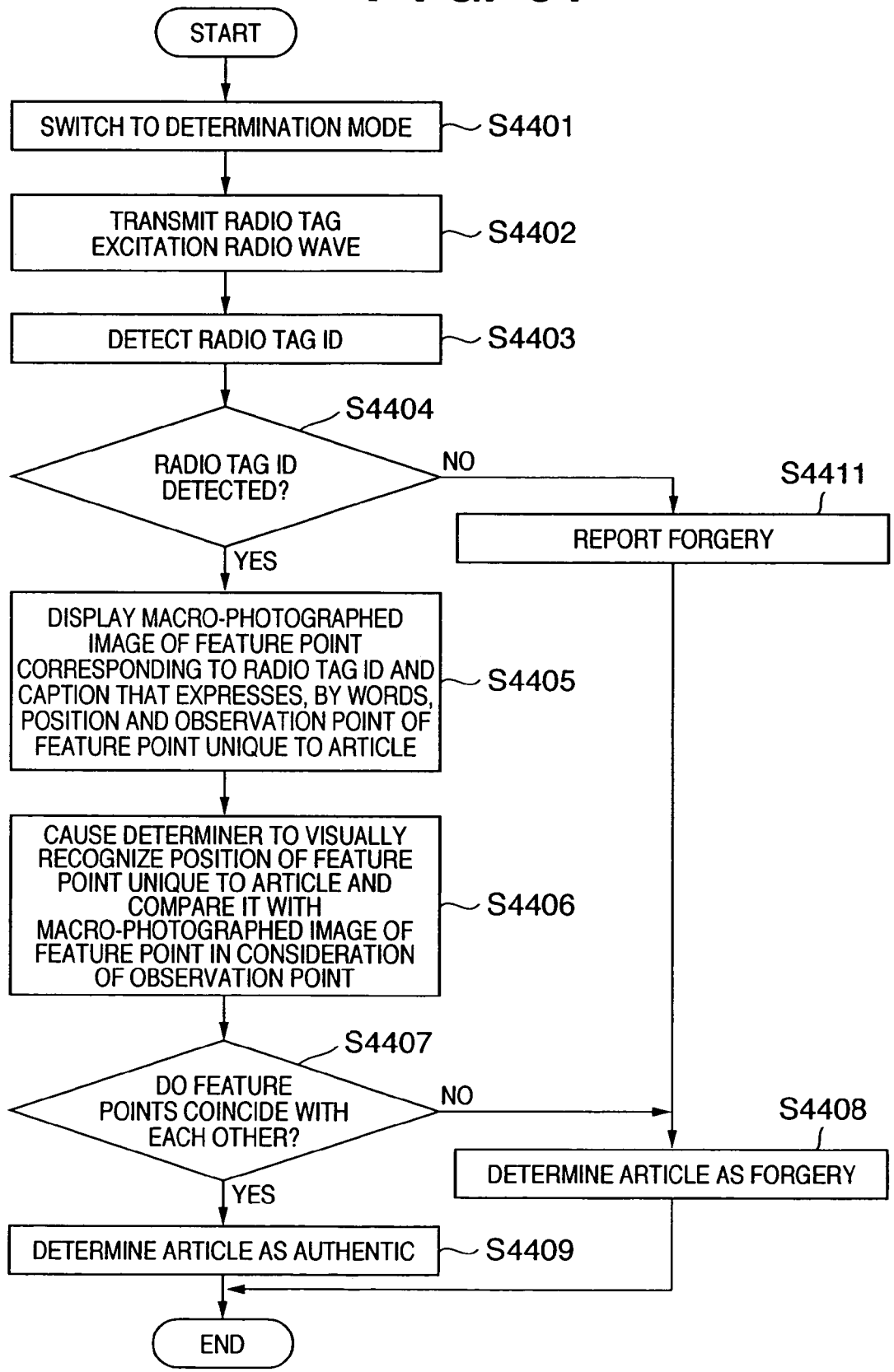
FIG. 34 is a flow chart for explaining an example of detection processing according to the 12th embodiment.

An example of detection processing executed by the article management apparatus 3801 and the user will be described below with reference to the flow chart shown in FIG. 34. When the article management apparatus 3801 is switched to a search mode (step S4401), it transmits a radio wave that excites a radio tag in step S4402. The determiner (user) moves the radio tag detector 3810 of the article management apparatus 3801 close to the bag 3803.

In step S4403, radio tag ID detection processing is executed for a predetermined time. If no radio tag ID is detected (NO in step S4404), the flow advances to step S4411 to notify the user, by screen display, sound, or light, that the bag at the shop is different from that registered in the DB and may be a forgery, or the radio tag may have been changed.

When a radio tag ID is detected (YES in step S4404), the flow advances to step S4406 to search for a radio tag ID stored in the DB by registration processing, read out a macro-photographed image and caption (characters that explain the position and observation point of the feature portion of the article), which correspond to the radio tag ID that is the same as the detected radio tag ID, and display the photographed image and caption on the display section 3811. For example, the image (the macro-photographed image of a logo plate with a brand name) and caption ("note the logo plate and the character spacing of the brand name") as shown in FIG. 30 are displayed on the display section 3811.

In step S4407 the user visually compares and confirms the actual logo plate of the bag and the macro-photographed image of the feature portion (logo plate) of the bag, which is displayed as an image. If the features match, it is determined that the bag is authentic (step S4409). If the features do not match, it is determined that the bag at the shop is different from that registered in the DB and may be a forgery, or the radio tag may have been changed (step S4408).

In the 12th embodiment, in the registration processing, a caption that expresses, by words, the position and observation point of a feature portion unique to the photographed article is added. In the determination processing, determination is done in consideration of the caption that expresses, by words, the position and observation point of the feature portion unique to the photographed article. These processing operations may be omitted. In addition, the registration processing may allow that the caption that expresses, by words, the position and observation point of the feature portion unique to the photographed article is not added. If the caption that expresses, by words, the position and observation point of the feature portion unique to the photographed article is not added in the registration processing, the determiner himself/herself determines whether the whole article or a limited point should be observed and executes visual confirmation. For example, to detect an error such as a change of a radio tag, the image of the whole object suffices. No microscopic information such as a feature point is necessary.

As described above, according to the 11th and 12th embodiments, a storage means is used, in which radio information such as a tag ID acquired from a radio information transmission means such as a radio tag attached to an article and image information obtained by photographing the article are paired and stored. Radio information is acquired from a radio tag attached to an article and compared with the radio information stored in the storage means. When the pieces of radio information coincide with each other, the image is displayed. With this arrangement, article management can be executed by effectively using the radio information and image information.

The embodiments of the present invention have been described above. The present invention also incorporates an arrangement, in which to operate various kinds of devices to implement the functions of the embodiments, software program codes for implementing the functions of the embodiments are supplied to a computer in an apparatus or system connected to the various kinds of devices, and they are operated in accordance with programs stored in the computer (CPU or MPU) in the system or apparatus.

In this case, the software program codes themselves implement the functions of the above-described embodiments, and the program codes themselves constitute the present invention. As a transmission medium for the program codes, a communication medium (a wired line such as an optical fiber or a radio channel) in a computer network (e.g., a LAN, a WAN such as the Internet, or a radio communication network) system which propagates and supplies program information as a carrier wave can be used.

A means for supplying the program codes to the computer and, for example, a recording medium which stores the program codes constitutes the present invention. As a recording medium which stores the program codes, for example, a flexible disk, hard disk, optical disk, magnetooptical disk, CD-ROM, magnetic tape, nonvolatile memory card, or ROM can be used.

The functions of the above-described embodiments are implemented not only when the supplied program codes are executed by the computer but also when the program codes are executed in cooperation with the OS (Operating System) running on the computer or another application software.

The functions of the above-described embodiments are also implemented when the supplied program codes are stored in a memory in a function expansion board of the computer or a function expansion unit connected to the computer, and the CPU of the function expansion board or function expansion unit performs part or all of actual processing on the basis of the instructions of the program codes.

The shapes and structures of the respective sections described in the above embodiments are merely examples for practicing the present invention and never limit the technical scope of the present invention. That is, various changes and modifications can be made without departing from the spirit and scope of the present invention.

For example, in the above embodiments, a radio tag that ensures an operation power supply by an induced electromotive force by a radio wave has been described. However, there also exists a radio tag that has an internal power supply and transmits radio tag information. In this case, the radio tag is caused to transmit radio tag information by touching it. When such a radio tag is used, processing for powering on the radio tag is added in place of processing in step S3304 in FIG. 23 or processing in step S3904 in FIG. 29.

As many apparently widely different embodiments of the present invention can be made without departing from the spirit and scope thereof, it is to be understood that the invention is not limited to the specific embodiments thereof except as defined in the appended claims.

What is claimed is:

1. A photographing apparatus comprising:
   information acquisition means for acquiring radio information from information transmission means, the information transmission means being attached to a subject to store predetermined information and transmit the predetermined information as the radio information;
   a normal photographing mode in which the subject is photographed;
   a radio information registration photographing mode in which an image obtained by photographing the subject and the radio information from the subject are acquired; and
   when the radio information registration photographing mode is selected, the photographing mode is automatically switched to a macro-photographing mode wherein both photographing of the subject and acquisition of the radio information by said information acquisition means are executed on the basis of an operation of a common operation section.

2. The apparatus according to claim 1, wherein communication to acquire the radio information from the information transmission means is started in a time before image sensing processing for executing photographing of the subject and acquisition of the radio information, and when the communication has successfully been done, processing shifts to the image sensing processing.

3. The apparatus according to claim 2, wherein the time before image sensing processing is a time after a photographing instruction operation.

4. The apparatus according to claim 3, wherein the photographing instruction operation is to press a shutter button halfway.

5. The apparatus according to claim 4, wherein, when the communication to acquire the radio information is started in a half-pressed state of the shutter button, and the communication has successfully been done, processing shifts to the image sensing processing when the shutter button is pressed completely.

6. The apparatus according to claim 3, wherein the photographing instruction operation is to press a shutter button fully.

7. The apparatus according to claim 6, wherein, when the communication to acquire the radio information is started in a fully pressed state of the shutter button, and the communication has successfully been done, processing immediately shifts to the image sensing processing.

8. The apparatus according to claim 2, wherein the time before image sensing processing is a time after selection of a radio information registration photographing mode and before a photographing instruction operation.

9. The apparatus according to claim 2, wherein the communication to acquire the radio information from the information transmission means is started by sending an excitation radio wave to the information transmission means.

10. The apparatus according to claim 2, wherein the information transmission means has an internal power supply, and when communication within a predetermined time and/or a predetermined number of times of communications can be executed upon receiving an instruction, the communication to acquire the radio information from the information transmission means is started by giving an instruction to the information transmission means.

11. The apparatus according to claim 2, further comprising means for, when the communication to acquire the radio information from the information transmission means has failed, warning or advising a user without shifting processing to the image sensing processing.

12. The apparatus according to claim 2, further comprising determination means for, when the communication to acquire the radio information from the information transmission means has successfully been done, determining before processing shifts to the image sensing processing whether the radio information can uniquely be specified.

13. The apparatus according to claim 12, further comprising means for, when the radio information cannot uniquely be specified, warning or advising a user without shifting processing to the image sensing processing.

14. The apparatus according to claim 1, wherein said information acquisition means is a radio tag detector which is arranged and attached at a position where a sufficient sensitivity can be maintained when the photographing apparatus is set in a photographing direction.

15. The apparatus according to claim 14, wherein a direction of directivity of the radio tag detector attached to the apparatus is substantially the same as the photographing direction of the photographing apparatus.

16. A photographing method for a photographing apparatus comprising:

selecting a normal photographing mode or a radio information registration photographing mode in the photographing apparatus;

photographing the subject when the normal photographing mode is selected; and when the radio information registration photographing mode is selected, obtaining an image by photographing the subject and acquiring radio information from information transmission means, the information transmission means being attached to a subject to store predetermined information and transmit the predetermined information as the radio information, the photographing mode being automatically switched to a macro-photographing mode wherein both photographing of the subject and acquisition of the radio information by the information acquisition means are executed on the basis of an operation of a common operation section.

* * * * *